United States Patent
Krening et al.

(10) Patent No.: US 11,765,679 B2
(45) Date of Patent: *Sep. 19, 2023

(54) MAPPING AND BRIDGING WIRELESS NETWORKS TO PROVIDE BETTER SERVICE

(71) Applicant: Comcast Cable Communications, LLC, Philadelphia, PA (US)

(72) Inventors: Derrick Krening, Castle Rock, CO (US); Edward David Monnerat, Parker, CO (US); Jonathan Alan Leech, Denver, CO (US); Nicholas Adam Pinckernell, Littleton, CO (US); Andy Martushev, Castle Rock, CO (US); Jasbir Rajpal, Parker, CO (US); Scott Moody, Colorado Springs, CO (US); Garey Hoffman, Denver, CO (US); David B. Leach, Centennial, CO (US); David O'hare, Greenwood Village, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/073,955

(22) Filed: Oct. 19, 2020

(65) Prior Publication Data
US 2021/0297981 A1  Sep. 23, 2021

Related U.S. Application Data

(63) Continuation of application No. 16/014,329, filed on Jun. 21, 2018, now Pat. No. 10,897,745, which is a (Continued)

(51) Int. Cl.
*H04W 64/00* (2009.01)
*H04W 16/18* (2009.01)
(Continued)

(52) U.S. Cl.
CPC ........ *H04W 64/003* (2013.01); *H04B 17/318* (2015.01); *H04W 16/18* (2013.01);
(Continued)

(58) Field of Classification Search
CPC ... H04W 64/003; H04W 16/18; H04W 88/08; H04W 48/10; H04W 40/246; H04B 17/318
See application file for complete search history.

(56) References Cited

U.S. PATENT DOCUMENTS 5,428,817 A * 6/1995 Yahagi .................. H04W 16/06 455/129
6,980,651 B2 12/2005 Litwin, Jr. et al.
(Continued)

FOREIGN PATENT DOCUMENTS

EP 2203024 A1 6/2010

*Primary Examiner* — Rasheed Gidado
(74) *Attorney, Agent, or Firm* — Banner & Witcoff, Ltd.

(57) ABSTRACT

Methods, systems, computer-readable media, and apparatuses for providing service to access nodes are presented. In some embodiments, a computing device may generate a geographical coverage map comprising a plurality of wireless access nodes respectively at a plurality of geographic locations and a wireless coverage range for each wireless access node. The computing device may receive from at least one wireless access node of the plurality of wireless access nodes an indication that the at least one wireless access node detected a first wireless access node of the plurality of wireless access nodes. The computing device may refine a first coverage range of the first wireless access node based on a respective geographic location of the at least one wireless access node. In some embodiments, a first wireless access node may receive and forward join emergency mesh (JEM) messages to establish a wireless network.

26 Claims, 10 Drawing Sheets

Related U.S. Application Data continuation of application No. 15/394,105, filed on Dec. 29, 2016, now Pat. No. 10,034,266, which is a continuation of application No. 14/259,009, filed on Apr. 22, 2014, now Pat. No. 9,578,620.

(51) Int. Cl.
  *H04W 40/24* (2009.01)
  *H04W 48/10* (2009.01)
  *H04B 17/318* (2015.01)
  *H04W 88/08* (2009.01)

(52) U.S. Cl.
  CPC ......... *H04W 40/246* (2013.01); *H04W 48/10* (2013.01); *H04W 88/08* (2013.01)

(56) References Cited

U.S. PATENT DOCUMENTS

| | | | |
|---|---|---|---|
| 7,158,497 B2 * | 1/2007 | Li | H04W 40/248 |
| | | | 370/349 |
| 7,411,911 B2 | 8/2008 | Huotari et al. | |
| 7,567,822 B2 * | 7/2009 | Hart | H04W 16/18 |
| | | | 370/310 |
| 7,924,786 B2 * | 4/2011 | Oh | H04W 36/30 |
| | | | 370/331 |
| 7,924,793 B2 | 4/2011 | Savoor et al. | |
| 8,131,303 B2 | 3/2012 | Cook et al. | |
| 8,151,336 B2 | 4/2012 | Savoor | |
| 8,189,532 B2 | 5/2012 | Vinayakray-Jani et al. | |
| 8,467,361 B2 | 6/2013 | Luetschwager et al. | |
| 8,548,495 B2 | 10/2013 | Waters et al. | |
| 8,559,410 B2 | 10/2013 | Kalika et al. | |
| 8,571,578 B1 | 10/2013 | Chen et al. | |
| 8,582,431 B2 | 11/2013 | Johansen | |
| 8,631,471 B2 | 1/2014 | Dattagupta et al. | |
| 8,885,570 B2 | 11/2014 | Lee | |
| 8,934,412 B2 * | 1/2015 | Gunnarsson | H04W 16/08 |
| | | | 370/328 |
| 8,938,785 B2 | 1/2015 | Coughlin et al. | |
| 8,971,919 B2 | 3/2015 | Do et al. | |
| 9,326,150 B2 | 4/2016 | MacDonald et al. | |
| 9,432,965 B2 | 8/2016 | Khemani et al. | |
| 9,608,891 B2 | 3/2017 | Kollu et al. | |
| 2007/0032219 A1 | 2/2007 | Rudolf et al. | |
| 2007/0081494 A1 * | 4/2007 | Petrescu | H04W 36/0016 |
| | | | 370/331 |
| 2008/0085699 A1 | 4/2008 | Hirano et al. | |
| 2009/0046644 A1 | 2/2009 | Krishnaswamy et al. | |
| 2010/0074190 A1 | 3/2010 | Cordeiro et al. | |
| 2013/0005297 A1 | 1/2013 | Sanders et al. | |
| 2013/0148573 A1 | 6/2013 | Boland et al. | |
| 2013/0230028 A1 | 9/2013 | Calcev et al. | |
| 2013/0279349 A1 | 10/2013 | Pandey et al. | |
| 2013/0326069 A1 | 12/2013 | Wang et al. | |
| 2014/0066046 A1 | 3/2014 | Keshavdas et al. | |
| 2014/0086212 A1 | 3/2014 | Kafle et al. | |
| 2014/0119220 A1 | 5/2014 | Wang | |
| 2014/0120928 A1 * | 5/2014 | Dimou | H04W 52/0216 |
| | | | 455/452.1 |
| 2014/0179317 A1 | 6/2014 | Tanaka | |
| 2014/0211691 A1 | 7/2014 | Emadzadeh et al. | |
| 2014/0376370 A1 * | 12/2014 | Cioffi | H04L 41/0659 |
| | | | 370/230 |
| 2015/0051975 A1 | 2/2015 | Kadous et al. | |
| 2015/0092574 A1 | 4/2015 | Kuan et al. | |
| 2015/0126215 A1 | 5/2015 | Pandey | |
| 2015/0244586 A1 | 8/2015 | Lee et al. | |
| 2016/0345369 A1 * | 11/2016 | Mestanov | H04W 8/26 |

* cited by examiner

MAPPING AND BRIDGING WIRELESS NETWORKS TO PROVIDE BETTER SERVICE

CROSS-REFERENCE TO RELATED APPLICATIONS

This application is a continuation of U.S. application Ser. No. 16/014,329, filed on Jun. 21, 2018, which is a continuation of U.S. application Ser. No. 15/394,105, filed on Dec. 29, 2016 (now U.S. Pat. No. 10,034,266), which is a continuation of U.S. application Ser. No. 14/259,009, filed on Apr. 22, 2014 (now U.S. Pat. No. 9,578,620), the disclosures of which are hereby incorporated by reference in their entirety.

FIELD OF ART

Aspects of the disclosure present methods and systems relate to coverage area information of access nodes and using such information, for example, to establish a wireless network connecting the access nodes to improve service, for example, during emergencies or disasters.

BACKGROUND

Service providers have deployed a large number of wireless-enabled devices (e.g., modems, routers, etc.) to users (e.g., subscribers, customers, etc.). However, service providers have little knowledge regarding the actual wireless service area covered by these devices and also have little ability to detect unauthorized devices that are spoofing a user's authorized device, for example, at locations outside of the customer's residence or business. Additionally, service providers generally provide service to the wireless-enabled devices through interconnected communication lines (e.g., coaxial cables, optical fibers, etc.). Because these lines have a fixed maximum bandwidth, there is an inherent fixed amount of data that a user's device can receive though those lines at any given time. Further, the service provider may not be able to provide any bandwidth to some of the devices in the event of a network outage caused by, for example, a disaster or accident resulting in a cut in the communication lines and/or disablement of a service-providing headend device. In such instances, the service provider may not be able to broadcast a message to the devices.

SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, a computing device may generate a geographical coverage map comprising a plurality of wireless access nodes respectively at a plurality of geographic locations and a wireless coverage range for each wireless access node. The computing device may receive, from at least one wireless access node of the plurality of wireless access nodes, an indication that the at least one wireless access node detected a first wireless access node of the plurality of wireless access nodes. The computing device may refine a first coverage range of the first wireless access node based on a respective geographic location of the at least one wireless access node.

In some embodiments, a first wireless access node may receive, from a second wireless access node within a wireless range of the first wireless access node, a join emergency mesh (JEM) message comprising a request to establish a wireless network at least between the first wireless access node and the second wireless access node. The JEM message may indicate that the second wireless access node does not have network connectivity to a headend device. The first wireless access node may detect that the first wireless access node does not have network connectivity to the headend device. The first wireless access node may forward the JEM message to a third wireless access node different from the second wireless access node. The third wireless access node may be within the wireless range of the first wireless access node.

In some embodiments, a first wireless access node may receive a join emergency mesh (JEM) message and a first private service set identifier (SSID) from a second wireless access node using a public SSID. In response to a determination that the first wireless access node does not have network connectivity with a headend device, the first wireless access node may send the JEM message and a second private SSID of the first wireless access node to a third wireless access node using the public SSID. The third wireless access node may be different from the second wireless access nodes. The first wireless access node may establish a wireless network between the first wireless access node and the second wireless access node using the first private SSID and the first wireless access node and the third wireless access node using the second private SSID.

Aspects of the disclosure may be provided in a system, an apparatus, or a computer-readable medium having computer-executable instructions to perform one or more of the process steps described herein.

These features, along with many others, are discussed in greater detail below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
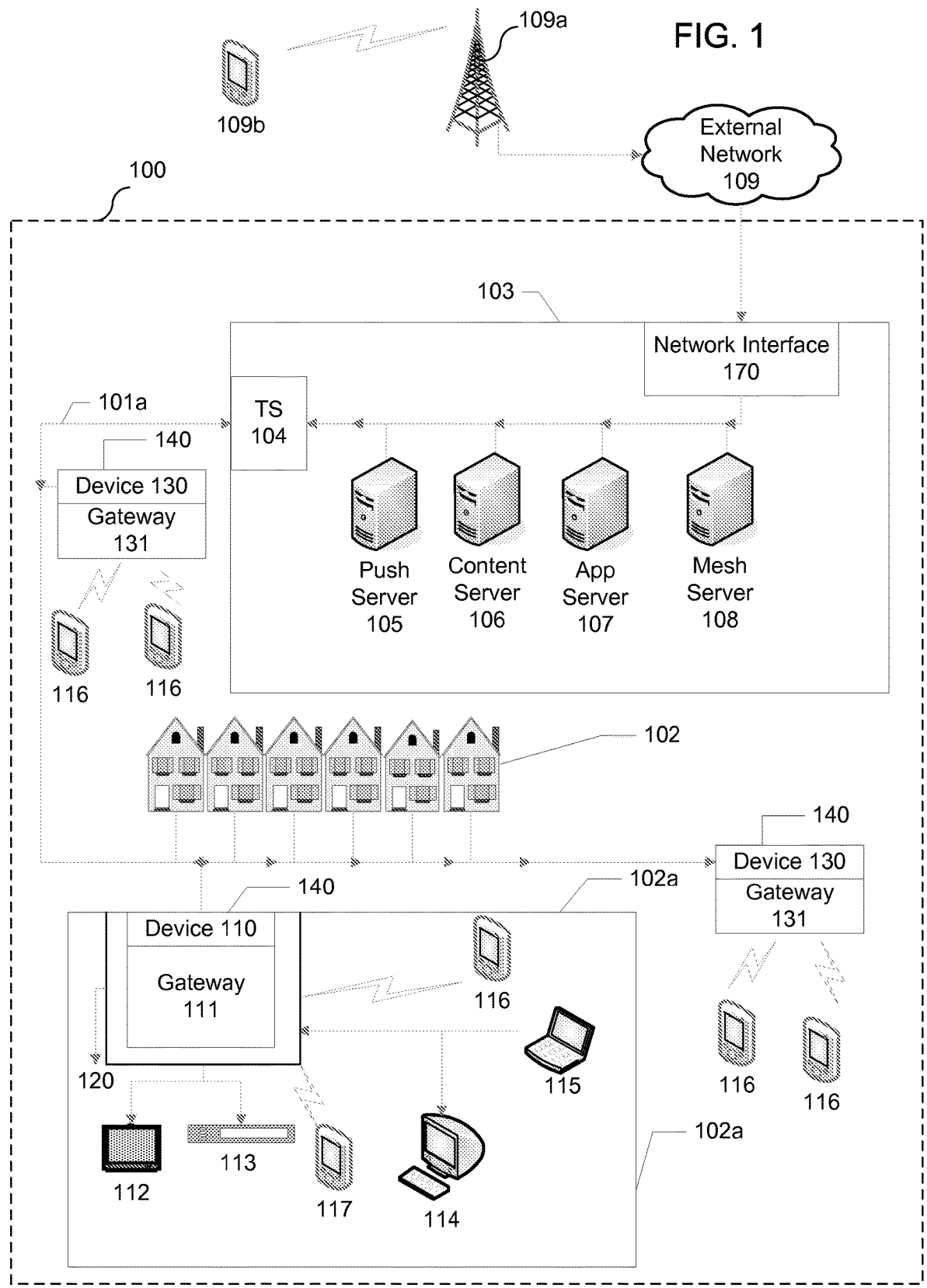
FIG. 1 illustrates an exemplary network in accordance with various aspects of the disclosure.

FIG. 1 illustrates an example network 100, such as a telecommunications or a content delivery network, on which many of the various features described herein may be implemented. The network 100 may be any type of information distribution network, such as satellite, telephone, cellular, wireless, etc. One example may be an optical fiber network, a coaxial cable network, or a hybrid fiber/coax (HFC) distribution network. Such networks 100 may use a series of interconnected communication lines 101a (e.g., coaxial cables, optical fibers, wireless links, etc.) to connect access nodes 140 and other locations 102 (e.g., businesses, homes, consumer dwellings, etc.) to a central location or office (e.g., headend) 103. The central office 103 may transmit downstream information signals onto the lines 101a to the access nodes 140 and other locations 102. Each access node 140 and other locations 102 may have a receiver used to receive and process those signals.

There may be one line 101a originating from the central office 103, and it may be split a number of times to distribute the signal to various access nodes 140 and other locations 102 in the vicinity (which may be many miles) of the central office 103. Herein, the access nodes 140 may refer to hardware modules including e.g., a device 130, such as a modem, and a gateway interface 131. In some aspects, an access node 140 may refer to a wireless (e.g., Wi-Fi, etc.) hotspot that allows various user devices 116 (wireless laptops and netbooks, mobile phones, mobile televisions, personal digital assistants (PDA), etc.) to connect to network 100 and external networks 109 for access to various content, including content found over the Internet. Device 130 may include transmitters and receivers used to communicate on the lines 101a and with the central office 103. Within a given access node 140, the device 130 may be, for example, a coaxial cable modem (for the coaxial cable lines 101a), a fiber interface node (for the fiber optic lines 101a), or any other desired device. Meanwhile, the gateway interface device 131 may be a computing device (e.g., a router for wireless (e.g., Wi-Fi, etc.) connectivity, etc.) that communicates with the device 130 to allow one or more wireless devices 116 to communicate with the central office 103 and other devices beyond the central office 103, such as those devices connected to the external networks 109. The gateway 131 may also include wireless network interfaces (not shown) to provide communication signals to wireless devices 116. The access node 140 may transmit more than one wireless network identifier (e.g., SSID). For example, the access node 140 may transmit one network identifier which is configurable by a subscriber or user and another network identifier which is only configurable by the service provider.

Meanwhile, the locations 102 may be any type of user premises, such as homes, businesses, institutions, etc. The lines 101a may include components not illustrated, such as splitters, filters, amplifiers, etc. to help convey the signal clearly, but in general each split introduces a bit of signal degradation. Portions of the lines 101a may also be implemented with fiber-optics, while other portions may be implemented with other types of lines or wireless communication paths.

The central office 103 may include an interface, such as a termination system (TS) 104. More specifically, the interface 104 may be a cable modem termination system (CMTS), which may be a computing device configured to manage communications between devices on the network of lines 101a and backend devices such as servers 105-108 (to be discussed further below). Backend devices such as servers 105-108 may be located in close proximity to one another (e.g., in the same building) and/or far apart (e.g., separate cities, countries, etc.) and may be connected to one another over various communication platforms, including over a cloud computing environment. The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems 130, 110 at the various access nodes 140 and other locations 102, and to receive upstream communications from the devices 130, 110 on one or more upstream channels or frequencies.

The central office 103 may also include one or more network interfaces 170, which can permit the central office 103 to communicate with various other external networks 109. That is, the network interface 170 may include circuitry needed to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, and any other desired network. For example, the external network 109 may include a cellular telephone network 109a and its corresponding cell phones 109b.

As noted above, the central office 103 may include a variety of servers 105-108 that may be configured to perform various functions, including providing content to access nodes 140 and other locations 102, the cell phones 109b, and other devices on the external networks 109. For example, the central office 103 may include a push notification server 105. The push notification server 105 may generate push notifications to deliver data and/or commands to various access nodes 140 and other locations 102 in the network (or more specifically, to the devices in access nodes 140 and other locations 102 that are configured to detect such notifications). The central office 103 may also include a content server 106. The content server 106 may be one or more computing devices that are configured to provide content to users at the access nodes 140 and/or the locations 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting data such as television program listings information and generating a data download for electronic program guide listings. Another application server 107 may be responsible for monitoring user viewing habits and collecting that information for use in selecting advertisements. Another application server 107 may be responsible for formatting and inserting advertisements in a video stream being transmitted to the access nodes 140 and other locations 102. And another application server 107 may be responsible for receiving user remote control commands, and processing them to provide an intelligent remote control experience.

An example location 102a (e.g., one of locations 102) may include an interface 120. The interface 120 can include any communication circuitry needed to allow a device to communicate on one or more links 101a with other devices in the network. Similar to an access node 140, the interface 120 may comprise a device 110, such as a modem, which may also include transmitters and receivers used to communicate on the lines 101a and with the central office 103. The device 110 may be, for example, an embedded digital voice adapter (eDVA), an embedded multimedia adapter (eMTA), a coaxial cable modem (for coaxial cable lines 101a), a fiber interface node (for the fiber optic lines 101a), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. The device 110 may be connected to, or be a part of, a gateway interface device 111. Similar to the gateway interface device 131, the gateway interface device 111 may be a computing device that communicates with the device 110 to allow one or more other devices at the location 102a to communicate with the central office 103 and other devices beyond the central office 103, such as those devices connected to the external networks 109. In some embodiments, the gateway interface device 111 may operate to communicate with devices 112-116 located over a smaller distance than the distance between gateway 131 and user devices 116. The gateway 111 may be a set-top box (STB), a digital transport adapter (DTA), a digital video recorder (DVR), computer server, or any other desired computing device. The gateway 111 may also include local network interfaces (not shown) to provide communication signals to devices 112-116 at the location 102a, such as display devices 112 (e.g., televisions), additional STBs or DVRs 113, personal computers 114, laptop computers 115, wireless devices 116 (e.g., wireless routers, wireless laptops and netbooks, notebooks, tablets, cordless phones, mobile phones, mobile televisions, personal digital assistants (PDAs), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

In addition to the examples of the term "access node" provided above, the term "access node" 140, "wireless access node," "access point" or "wireless access point" as used herein may also refer to one or more devices at the locations 102 including, for example, the interface 120, the device 110 (e.g., a cable modem such as an eMTA and/or a wireless router to provide a Wi-Fi hotspot), the devices 116, or any other computing device discussed in connection with sample location 102a.

In addition, the central office 103 may include a node location server 108 to receive data (e.g., wireless coverage data) collected by various deployed access nodes. The server 108 may analyze the collected data to generate estimate locations of access points unknown to the server 108 and to estimate coverage data (e.g., maps) of the area. In performing these functions, server 108 may also request, collect, store, and analyze various data from the access nodes 140 including system information (e.g., maps), and/or wireless (e.g., Wi-Fi) received signal strength indicator (RSSI) levels, SSID, communication channel information, and device identifier information of access points operating in the area.

The node location server 108 may also be referred to herein as a "mesh server." The mesh server 108 may model potential wireless mesh networks and may create one or more wireless mesh networks (e.g., an ad hoc Wi-Fi network) by sending instructions and/or configuration files to the access nodes 140 to form the one or more wireless mesh networks. A wireless mesh network may include one or more access nodes 140. The wireless mesh network may be formed by bridging the wireless connections of neighboring access nodes 140 with one another to enable communication between the access nodes 140. Each wireless mesh network may include one or more egress access nodes (e.g., the access nodes 140 that have connectivity over a distribution network to the central office 103). The distribution network may include one or more devices of the central office 103 (e.g., a CMTS) and/or one or more links 101a (e.g., lines 101a, etc.) connected to that particular access node 140 from which the access node 140 typically receives service from the central office 103.

Once a wireless mesh network is established among multiple access nodes 140, the mesh server 108 may configure the access nodes 140 to perform a number of functions. In one example, the access nodes 140 may detect and report the detection of devices and/or other access nodes 140 to the mesh server 108. The mesh server 108 may determine if there has been a theft of service based on, for example, a comparison of where an access node 140 is determined to be approximately located and the location of the access node 140 stored in a database of the central office 103. In another example, the mesh server 108 may provision and/or enable one or more particular access nodes 140 to receive a bandwidth and a data speed greater than that of the maximum bandwidth capacity and data speed of particular lines 101a connected to those particular access nodes 140. For example, the particular access points 140 may, using the wireless mesh network, connect to one or more other access nodes 140 that are connected to one or more different lines 101a to receive the additional bandwidth and/or throughput. In another example, the mesh server 108 may transmit messages to each access node 140 through one or more wireless mesh networks. Each access node 140 may, upon receiving the message, output the message to its user (e.g., subscriber, customer, etc.) and may forward (e.g., relay or propagate) the message to other access nodes 140. In yet another example, the mesh server 108 may configure the access nodes 140 to establish the one or more wireless mesh networks in response to an emergency or disaster affecting one or more distribution networks. For example, the mesh server 108 and/or the access nodes 140 may begin establishing the wireless mesh network in response to determining a loss of network connectivity over one of the distribution networks for a predetermined time period.

Although shown separately, one of ordinary skill in the art will appreciate that the push server 105, the content server 106, the application server 107, and the mesh server 108 may be combined. Further, here the push server 105, the content server 106, the application server 107, and the mesh server 108 are shown generally, and it will be understood that they may each contain memory storing computer executable instructions to cause a processor to perform steps described herein and/or memory for storing data.

Figure 2:
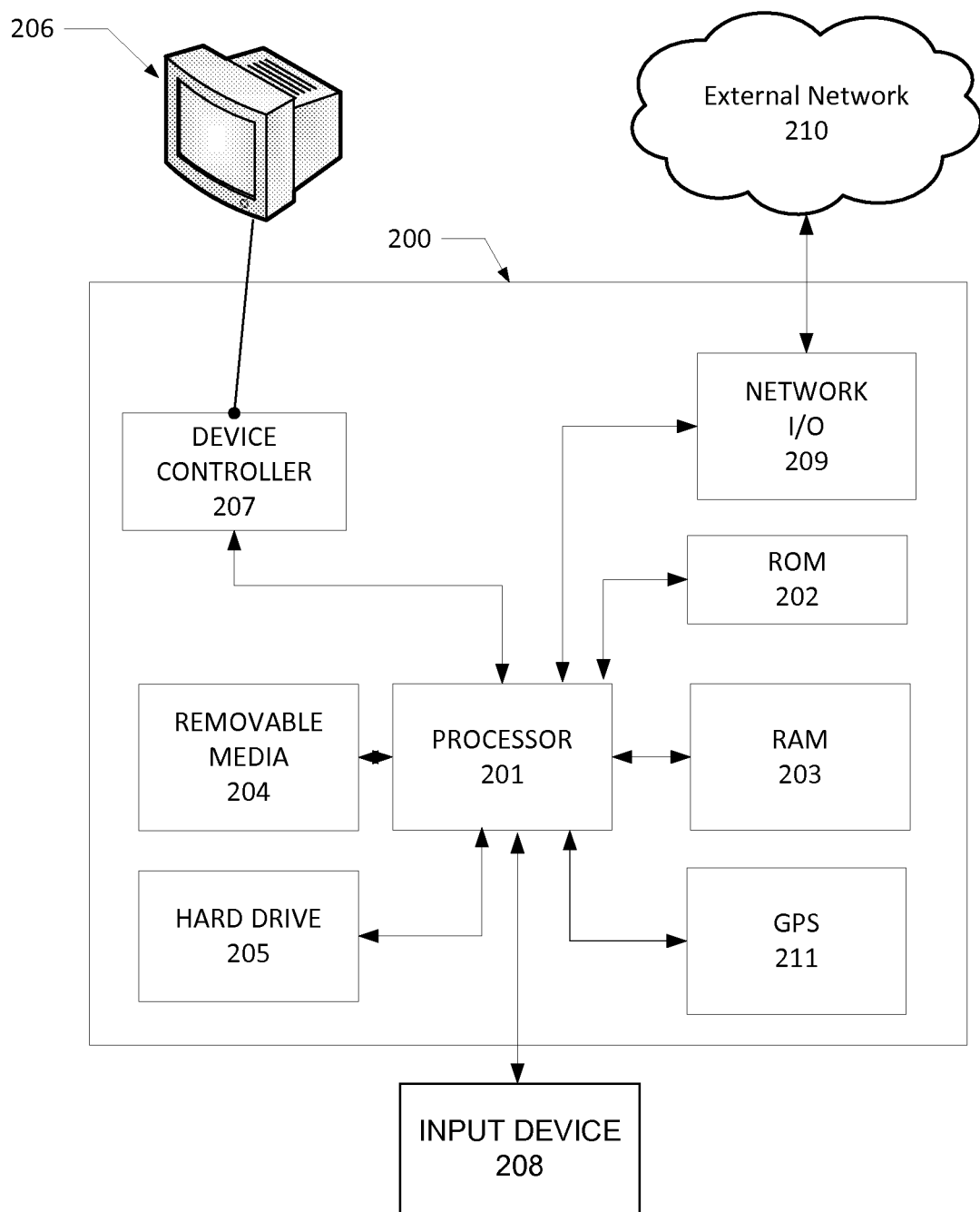
FIG. 2 illustrates an exemplary hardware and software platform on which various elements described herein can be implemented in accordance with various aspects of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, removable media 204, such as a Universal Serial Bus (USB) drive, compact disk (CD) or digital versatile disk (DVD) drive, and/or floppy disk drive, or any other desired electronic storage medium. Instructions and/or other data may also be stored in an attached (or internal) hard drive and/or data repository 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (e.g., a network card) to communicate with a network 210. The network interface 209 may be a wired interface, wireless interface, or a combination of the two. In some embodiments, the network interface 209 may include a device (e.g., a cable modem), and the network 210 may include the communication lines 101a discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. One or more computing devices discussed herein may include some or all of the components discussed in FIG. 2, along with additional components.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
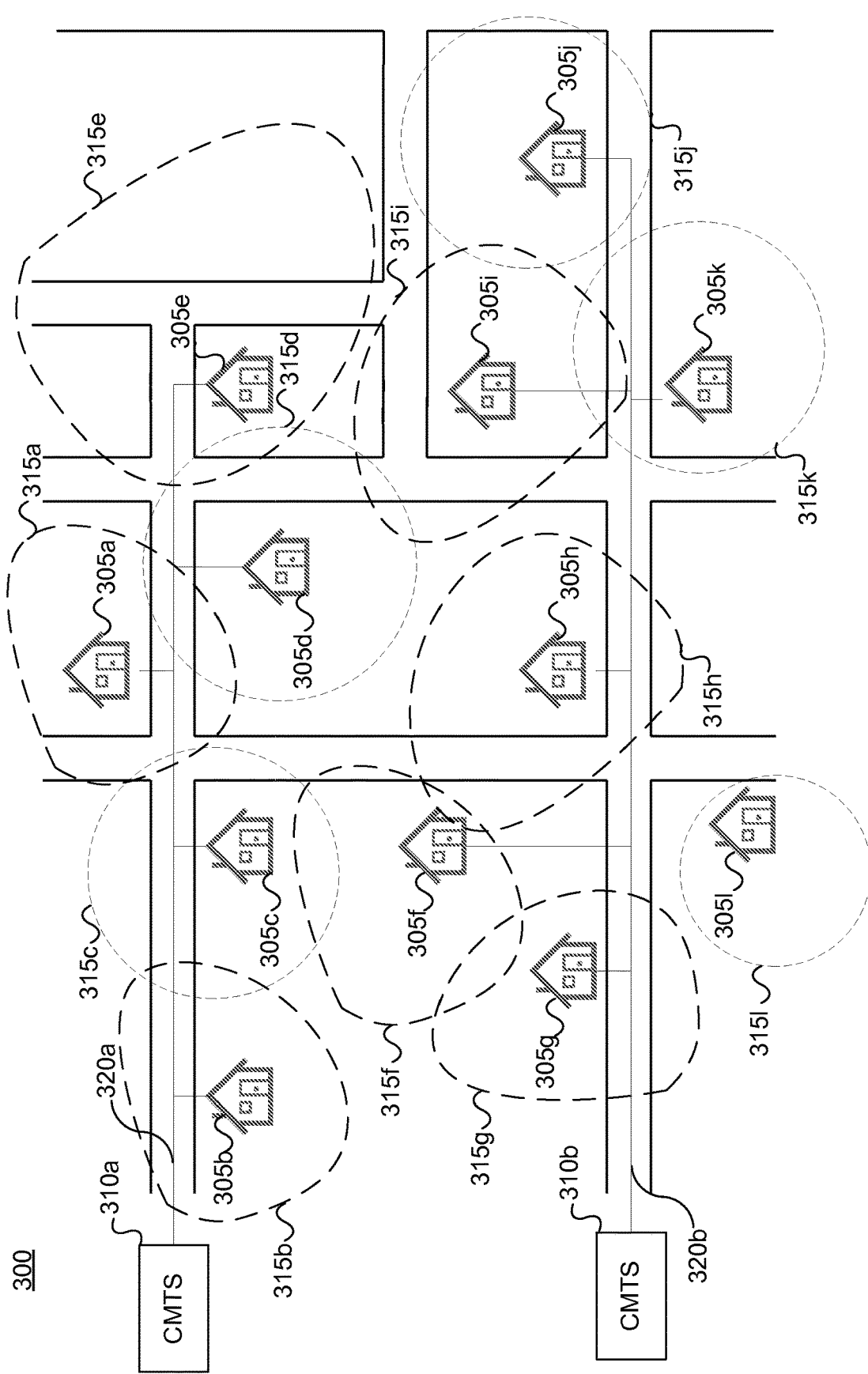
FIG. 3 illustrates an exemplary wireless coverage map of multiple wireless access points in an area in accordance with one or more illustrative aspects discussed herein.

FIG. 3 illustrates an exemplary wireless coverage map of multiple wireless access points in an area in accordance with one or more illustrative aspects discussed herein. A mesh server 108 may generate a wireless coverage map 300, which may include a geographical map of a particular area (e.g., a neighborhood, retail center, business district, commercial or residential buildings, and the like). In this exemplary embodiment, the wireless coverage map 300 is of a residential neighborhood. The mesh server 108 may plot and/or otherwise illustrate on the map 300 multiple access points 305a-1 connected to multiple CMTSs 310a-b via lines 320a-b. The access points 305a-1 may be associated with a particular service provider. Optionally, access points (e.g., residences) associated with a different service provider may also be shown on the map 300.

The mesh server 108 may plot and/or otherwise illustrate each of the access points 305a-1 on the map 300 at their approximate geographic locations based on location information (e.g., latitude and longitude, GPS information, triangulation information, associated street address, and the like). The mesh server 108 may retrieve the location information from one or more of a database of the central office 103 and/or may receive the location information from one or more of the access points 305a-1 and/or another entity who provides location information services.

The mesh server 108 may determine a device type for each of the access points 305a-1. For example, when the service provider deploys devices to access points 305a-1, the service provider may log the device type in a database of the central office 103. Additionally or alternatively, in instances where either the device type is not stored in the database (e.g., because the user purchased the device and, thus, the service provider did not deploy the device), the mesh server 108 may use Simple Network Management Protocol (SNMP) or similar technology to identify the device type and/or may otherwise retrieve from the device it's device type (e.g., by sending a request to the device and receiving a response from the device).

Once the device type is determined, the mesh server 108 may determine the designed wireless range of each device (e.g., access points 305a-1) by retrieving range information from a database of the central office or from another entity. For example, a first device type may have an effective range of 200 feet while a second device type may have an effective range of 100 feet. The mesh server 108 may plot and/or otherwise illustrate on the map 300 an initial estimated wireless coverage range 315a-1 (e.g., contours) for each access point 305a-1 based on the designed wireless range of each device type. For example, a circular wireless range of 100 feet may be placed around one or the particular access points (e.g., access point 305d).

The mesh server 108 may account for the physical topography of each particular residence associated with each access point 305a-1. For instance, the physical topography may include physical barriers including, for example, walls (e.g., concrete walls), floors, trees, other buildings or structures, signal interference, and the like. The physical barriers within the designed wireless range of the access point 305a-1 may reduce the effective wireless range of that access point 305a-1 in a particular direction. As a result, while the designed wireless range may be circular in shape, the effective wireless range might not be circular in shape.

The mesh server 108 may determine the actual effective wireless ranges 315a-1 (e.g., the true nature of the Wi-Fi signal emitting from the access points 305a-1) through the use of network information provided by the access points 305a-1. Particularly, the access points 305a-1 may be wireless access points 305a-1 (e.g., Wi-Fi-enabled devices) in accordance with wireless protocol (e.g., IEEE 802.11 standard). In order to facilitate discovery of a particular access point (e.g., access point 305a) by other access points (e.g., access points 305c-d) and/or other wireless devices (e.g., signal detector, tablet, computer, cell phone, and the like), the particular access point (e.g., access point 305a) may broadcast network information including a network identifier (e.g., the public SSID provided by the service provider), network mode, and a device identifier such as a medium access control (MAC) address of the particular access point (e.g., access point 305a).

One or more other access points (e.g., access points 305c-d) and/or other wireless devices may receive the broadcast signal which may be a beacon signal at a particular signal strength depending on a variety of factors including distance from the broadcasting point, interference, and surrounding environment (e.g., buildings, objects, geographical features, elevation). The received signal strength of the broadcast signal may be a received signal strength indication (RSSI) and may be determined by the access point receiving the broadcast signal. The wireless access points 305a-1 may broadcast the beacon signals on the same or different communication channels such as different frequency channels. These channels may be channels defined by the IEEE 802.11 standards. In some embodiments, other protocols may be used including e.g., cellular protocols such as 3G, 4G, LTE, and the like. In some embodiments, the mesh server 108 may send an instruction to access points 305d-e within the designed range of access point 305a. The instruction may request access points 305d-e to determine whether they detect access point 305a via e.g., the public SSID and the associated RSSI.

For example, access points 305c-d located at neighboring residences may receive the broadcast network information from the access point 305a and may send to the central office 103 the network information, the RSSI and their own respective identifier (e.g., a MAC address of access points 305c-d). In other words, the mesh server 108 may receive from at least one access point an indication that the access point detected a particular access point. In response, the central office 103 may retrieve, e.g. from a database or entity, the location information (e.g., the address, latitude and longitude, etc.) of the access points 305a,c-d. The mesh server 108 may then refine the effective coverage range 315a of the access point 305a based on the location information of access points 305a,c-d and the received RSSIs.

The access point 305e might not detect access point 305a. The access point 305e may send an indication to the mesh server 108 that access point 305e has not detected access point 305a. The mesh server 108 may further refine the effective coverage range 315a of access point 305a based on the location information of the access point 305a and the access point 305e.

In some embodiments, a technician of the service provider may, after installing or servicing an access point 305a, walk around the property of the user with a signal detector to receive the broadcasted network information from the access point 305a and may also determine location information of the signal detector. The signal detector may create a location-to-RSSI index. The signal detector may send the index to the central office 103. In some embodiments, the signal detector may send the network information received from the access point 305a and the associated location information of the signal detector to the central office 103. The mesh server 108 may refine the map 300, in a manner similar to the above, based on the location of the signal detector, the RSSI, and the broadcast network information. Similarly, in some embodiments, a user of the service provider may walk down the street while using a device (e.g., a cell phone or tablet) to stream content from the service provider via a mobile app or a mobile web browser. The device may snoop and/or otherwise detect access points 305a-1 (e.g., Wi-Fi networks) that are within range of the device. The device may receive broadcast network information from the access points 305a-1 and may determine associated RSSIs. The device may send to the mesh server 108 the broadcast network information, RSSIs, and location information of the device (e.g., determined by a GPS of the device). The mesh server 108 may refine the map 300, in a manner similar to the above, based on the location of the device, the RSSI, and the broadcast network information.

In some embodiments, a mobile vehicle (e.g., a truck, mobile robot, etc.) may continuously or intermittently (e.g., periodically) snoop for SSIDs. For example, as the mobile vehicle travels within the effective range of access points 305a-1, the mobile vehicle may receive broadcast network information from one or more of the access points 305a-1 and determine associated RSSIs. The mobile vehicle may transmit to the mesh server 108 any detected broadcast network information and, optionally, the location information (e.g., GPS information) of the mobile vehicle. The mesh server 108 may refine the map 300 (e.g., wireless coverage ranges 315a-1) based on the location information of the mobile vehicle indexed with the broadcast network information and RSSIs for the one or more access points 305a-1.

Although the above discussed determining the effective wireless coverage range 315a of access point 305a, the mesh server 108 may also determine and refine the effective coverage ranges 315b-1 for each of the other access points 305b-1 in a similar manner.

The mesh server 108 may update the map 300 as information is received from one or more access points 305a-1 or devices (e.g., trucks, tablets, etc.). For example, the mesh server 108 may periodically send requests to neighboring access points (e.g., access points 305c-e) to determine whether those access points 305c-e are within the effective the wireless coverage range 315a of access point 305a. Thus, any of the functions discussed above may be repeated to update the map 300 to account for e.g., a user moving the access point from the first floor of his residence to the basement of his residence, trees growing, building being erected, and the like.

Once the map 300 is generated, the mesh server 108 may use the map 300 to identify overlaps in wireless coverage among the access points 305a-1. If the wireless coverage ranges between two access points overlap, the mesh server 108 may identify those two access points as being able communicate with one another, for example, via the public SSID. For example, the wireless coverage range 315a of access point 305a overlaps the wireless coverage range of 315c of access points 305c. As a result, the mesh server 108 may identify access points 305a,c as being able to communicate with one another. For example, consumer premise devices (e.g., tablets, computers, etc.) connected to the access point 305a may communicate with the access point 305c and consumer premise devices connected to the access point 305c and vice versa.

The mesh server 108 may use the map 300 to identify two access points that might not directly overlap in wireless coverage but may overlap in wireless coverage via one or more intermediate access points. For example, the wireless coverage range 315b of access point 305b may not directly overlap with the wireless coverage range 315k of access point 305k. However, the mesh server 108 may identify access point 305b as being able to communicate with access point 305k via intermediate access points 305a,c-d,i. In such instances, the intermediate access points 305a,c-d,i may forward (e.g., relay or propagate) any received messages. For example, the access point 305c may receive a message from the access point 305b and may forward the message to the access point 305a.

In some embodiments, the access points 305a-k may be able to wirelessly communicate via the public SSID provided by the service provider. Additionally or alternatively, in some embodiments, the access points 305a-k may be able to wirelessly communicate by establishing a wireless network (e.g., a wireless ad hoc Wi-Fi network) via multiple private SSIDs as will be discussed in more detail below. Further, the access points 305a-k and/or the mesh server 108 may send alert messages to one or more of the access points 305a-k and/or the mesh server 108 as will be discussed in greater detail below in connection with FIG. 7.

The mesh server 108 may also use the map 300 to identify gaps in wireless coverage over a given area (e.g., in the residential neighborhood). For example, if two portions of a neighborhood or two neighborhoods are missing an access point between them, then the mesh server 108 may identify that gap and determine one or more options for eliminating that gap. For example, the mesh server 108 may identify a first subset of the access points (e.g., access points 305a-k). The mesh server 108 may identify a second subset of the access points (e.g., access point 305l) different from the first subset. Although the second subset of access points shows one access point, the second subset of access points may include multiple access points with overlapping wireless coverage.

The mesh server 108 may identify a geographical gap in the wireless coverage between the first subset of access points 305a-k and the second subset of access points 305l. For example, the wireless coverage range 315l of the access point 305l might not overlap with the wireless coverage range 315g of the access point 305g or the wireless coverage range 315h of the access point 305h. As a result, the mesh server 108 may identify access point 305l as not being able to communicate with access points 305a-k.

The mesh server 108 may determine one or more options to eliminate the gap. For example, the mesh server 108 may retrieve the device type of each of the access points 305l,g-h in any manner discussed above. The mesh server 108 may determine the designed coverage range for each of the device types. The mesh server 108 may determine that switching one or more of the devices at the access points 305l,g-h to a different device type with a wider designed coverage range may result in an overlap coverage between the wireless coverage range 315l of access point 305l and the wireless coverage range 315g of access point 305g and/or the wireless coverage range 315h of access point 305h.

In some exemplary embodiments, the mesh server 108 may determine that if a new tower is placed at a particular location near (e.g., within a predefined distance) the access points 305l,g-h, then the access point 305l may be able to communication with access point 305g and/or access point 305h.

In some exemplary embodiments, the mesh server 108 may identify one or more access points associated with a different service provider and/or one or more locations 102 (e.g., residences) that may become new access points that would eliminate the gap in the wireless coverage. For example, the mesh server 108 may determine that a particular residence located between access point 305h and access point 305l (e.g., within the gap) may be able to eliminate the gap in coverage if that residence is added as an access point with a particular device type. The service provider may offer a discount to the owner or renter of that residence to incentivize that owner or renter to subscribe to the service provider. Thus, if residence becomes associated with a new access point, the gap in coverage may be eliminated and the map 300 may be updated by the mesh server 108. Once the mesh server 108 determines the one or more options to eliminate the gap in wireless coverage, the mesh server 108 may alert an operator of the service provider.

In one or more embodiments, the mesh server 108 may increase (e.g., boost) the bandwidth or data speed at a particular access point (e.g., access point 305c). For example, the mesh server 108 may increase the data speed and/or bandwidth capacity provisioned for the access point 305c over a first distribution network (e.g., a first line 320a). In some embodiments, the mesh server may remove any data speed and/or bandwidth capacity limitations to the access point 305c so that the data speed and/or bandwidth may be the maximum speed and capacity of the first line 320a. In some embodiments, the mesh server 108 may access a particular access point through a neighboring access point to trouble shoot any problems at the particular access point.

Additionally or alternatively, the mesh server 108 may determine that access point 305c may communicate with access point 305f based on the generated wireless coverage map 300. Further, the mesh server 108 may determine that access point 305c is connected to a first distribution network (e.g., to the first CMTS 310a via the first line 320a) based on the generated wireless coverage map 300. Similarly, the mesh server 108 may determine that access point 305f is connected to a second distribution network (e.g., to the second CMTS 310b via the second line 320b) based on the generated wireless coverage map 300. The second distribution network may be different from the first distribution network. The mesh server 108 may send to the access point 305c and/or the access point 305f an instruction to establish a wireless network (e.g., a wireless ad hoc Wi-Fi network) between access point 305c and access point 305f. In response, the mesh server 108 may receive from access point 305c and/or access point 305f an indication that the wireless network has been established.

The mesh server 108 might not use and/or otherwise send instructions to access points 305a-b,d-e because each of those access points 305a-b,d-e is on the same line (e.g., the first line 320a) as access point 305c. As a result, access points 305a-e share bandwidth capacity and data speed of the first line 320a.

The mesh server 108 may provision the access point 305c for a particular bandwidth capacity and/or a particular data speed using network connectivity of both the first distribution network and the second distribution network. For example, the access point 305c may utilize the bandwidth and data speed of the second distribution network via the wireless connection established between the access point 305c and access point 305f. In other words, the mesh server 108 may provision the access point 305c for a particular bandwidth capacity and/or a particular data speed by utilizing bandwidth and data speed of the first line 320a and by utilizing additional bandwidth and data speed of the wireless connection to access point 305f, which is obtained from the second line 320b. In some embodiments, the mesh server 108 may provision the access point 305c for a bandwidth capacity and/or a data speed beyond a maximum bandwidth capacity and/or data speed of the first line 320a by obtaining at least some of the bandwidth and/or data speed from the wireless connection. In some embodiments, the mesh server 108 may send to the access point 305c and/or the access point 305f an instruction to increase provisioned bandwidth on the access point 305c. The access point 305c may receive a multiplexed service from both the first distribution network and the second distribution network and might not be limited to the physical constraints of the first distribution network. In other words, the mesh server 108 may coordinate with other servers 105-107 to multiplex the stream across the two distribution networks to the access point 305c. In some embodiments, the access point 305c may make the increased bandwidth, data speed, and/or throughput available to one or more other access points (e.g., access points 305a,d-e).

While only two distributions networks (e.g., first line 320a and second line 320b) are shown, more than two distribution networks may provisioned for use by the access point 305c. In some embodiments, other access points may be provisioned for increased bandwidth and/or data speed across multiple distribution networks in a similar manner as discussed above.

The mesh server 108 may initiate (e.g., trigger) the increase in bandwidth for the access point 305c based on a comparison of characteristics of the distribution networks. For example, when the first distribution network is heavily congested (e.g., above a predetermined threshold) resulting in lower bandwidth (e.g., below a predetermined threshold) and/or a lower data speed (below a predetermined threshold) as compared to the second distribution network which may be less utilized, the mesh server 108 may increase bandwidth available to the access points on the first distribution network by bridging via a wireless connection to access points of the second distribution network.

In some embodiments, the wireless connections may enable the service provider to provide service to one or more access point not directly connected to a distribution network. For example, the wireless connection may be used to get new homes connected to the local office 103 more quickly (e.g., before they are connected to lines 101a).

Figure 4:
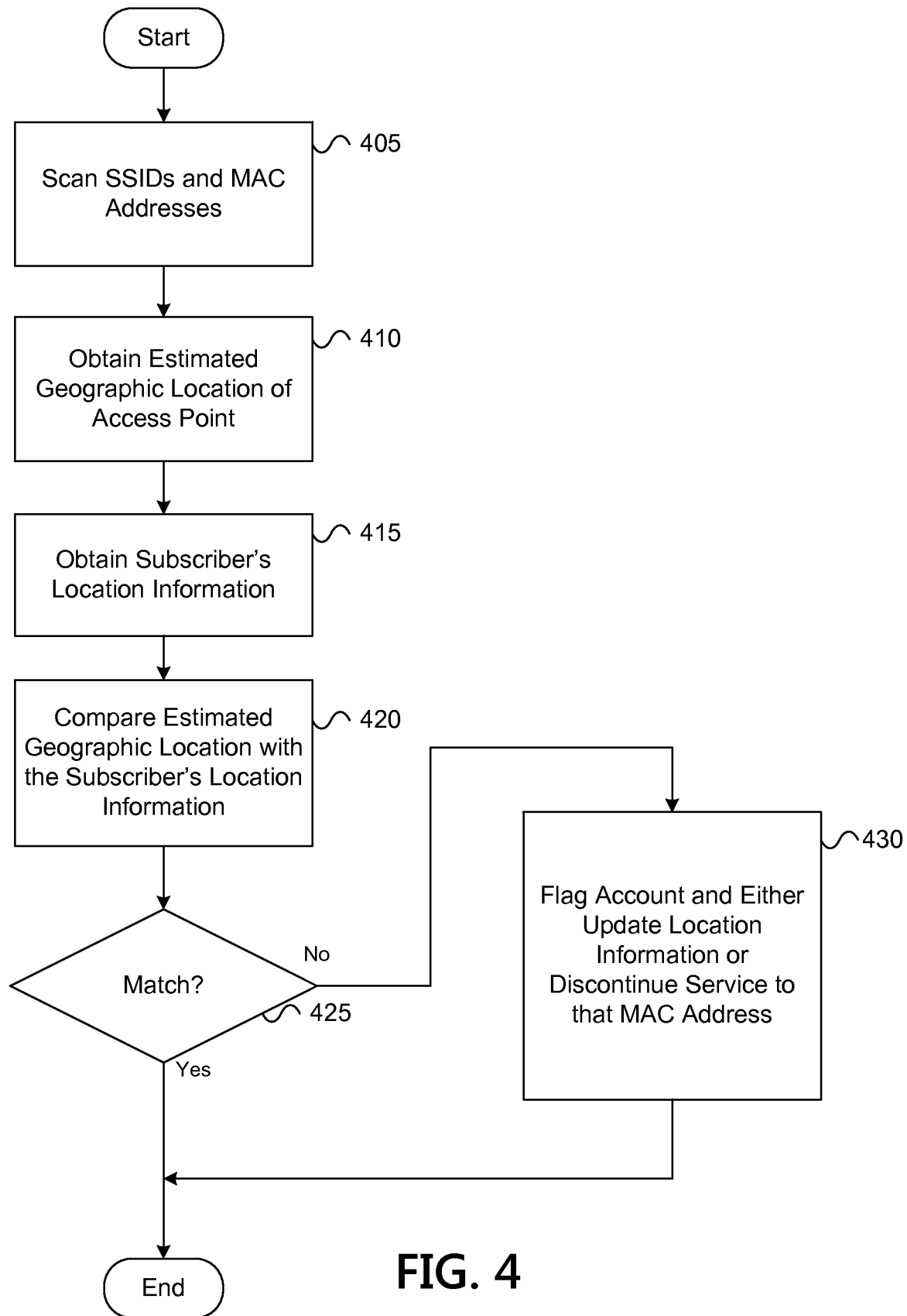
FIG. 4 illustrates a flowchart of an exemplary method for detecting theft of service in accordance with one or more illustrative aspects discussed herein.

FIG. 4 illustrates a flowchart of an exemplary method for detecting theft of service in accordance with one or more illustrative aspects discussed herein. In one or more embodiments, the method of FIG. 4 and/or one or more steps thereof may be performed by a computing device (e.g., computing device 200). In other embodiments, the method illustrated in FIG. 4 and/or one or more steps thereof may be embodied in computer-executable instructions that are stored in a computer-readable medium, such as a non-transitory computer-readable memory.

As seen in FIG. 4, the method may begin at step 405 in which a scanning device may scan for SSIDs (e.g., public SSIDs and private SSIDs provided to users) and MAC address of access points and/or devices connected to the access points (e.g., tablets, computers, cell phones, and the like). For example, in step 405, the scanning device may be, for example, a neighboring access point having overlapping wireless coverage with a particular access point, a mobile vehicle (e.g., a truck of the service provider), or any other computing device. In some instances, a neighboring access point may continuously or intermittently (e.g., periodically) detect one or more of a public SSID, a private SSID, and/or an emergency SSID broadcast from the particular access point. The neighboring access point may send a request for a MAC address of each device associated (e.g., connected) with the particular access point and, in response, may receive one or more MAC addresses of various devices. The neighboring access point may send to the mesh server 108 the received one or more MAC addresses, the SSID, and an identifier of the neighboring access device. The neighboring access point may send the information to the mesh server 108 via the one or more links 101a and/or via a wireless connection with one or more access points. In some embodiments, the neighboring access point may determine and send to the mesh server 108 the location information (e.g., GPS coordinate) of the neighboring access point. Additionally or alternatively, in some embodiments, the mesh server 108 may obtain the location information of the neighboring access point by retrieving the locations from a database of the central office 103.

In some exemplary embodiments, a mobile vehicle of the service provider moving along a route may continuously scan for SSIDs and MAC addresses as its wireless coverage range temporarily overlaps the wireless coverage range of the particular access point along the route. Similar to the neighboring access point discussed above, the mobile vehicle may send a request for SSIDS and/or MAC addresses and, once received from the particular access point, may send to the mesh server 108 the SSIDs and MAC addresses associated with the particular access point and the location information of the mobile vehicle (e.g., determined by a GPS within the mobile vehicle).

In step 410, the mesh server 108 may obtain estimated location information for the particular access point. For example, in step 410, the mesh server 108 may estimate the geographic location of the particular access point and/or devices connect to the particular access point based on the location information of one or more of the neighboring access point, the mobile vehicle, and/or any other computing device (e.g., other access points). For example, the mesh server 108 may retrieve the location information of the neighboring access point from a database of the central office 103. The mesh server 108 may retrieve location information of the mobile vehicle from a database of the central office 103 and/or may receive the location information from the mobile vehicle itself. The mesh server 108 may then, using the generated map (e.g., wireless coverage map 300), estimate the geographic location of the particular access point. In instances where mesh server 108 receives SSIDs, MAC addresses, and/or other identifiers from multiple neighboring access points or from a mobile vehicle and a neighboring access point, the mesh server 108 may use any known triangulation method to estimate the geographic location of the particular access point.

In step 415, the mesh server 108 may obtain the user's location information. For example, in step 415, the mesh server 108 may, using the received MAC address and/or SSIDs, lookup and/or otherwise retrieve the user's location information from a database of the central office 103. The user's location information may include a previously determined geographic location for the particular access point.

In step 420, the mesh server 108 may compare the estimated geographic location of the particular access point with the user's location information (e.g., the pre-stored geographic location of the access point of the user). For example, in step 420, the mesh server 108 may compare the estimated latitude and longitude, the associated address, and/or GPS coordinates of the particular access point with the pre-stored latitude and longitude, the associated address, and/or GPS coordinates of the access point of the user. In some embodiments, the particular access point and the access point of the user may be highlighted on the map 300 in different colors.

In step 425, the mesh server 108 may determine whether the estimated geographic location matches the user's location information. For example, in step 425, the mesh server 108 may determine that there may be a match when the estimated geographic location is within a predefined or user-specified geographic distance of the pre-stored geographic location. Similarly, the mesh server 108 may determine that there might not be a match when the estimated geographic location is outside of a predefined or user-specified geographic distance of the pre-stored geographic location. In response to a determination that the estimated geographic location matches the particular known (e.g., pre-stored) geographic location, the method may end. In response to a determination that the estimated geographic location does not match the particular known geographic location, the method may proceed to step 430.

In step 430, the mesh server 108 may flag the user's account and either update the pre-stored geographic location or discontinue service to one or more of the received MAC address. For example, in step 430, the mesh server 108 may flag the user's account to an operator of the service provider. The mesh server 108 may, in response to receiving an indication that the device associated with the MAC address is in the correct geographic location, update the user's location information in the database. The mesh server 108 may, in instances where the device associated with the MAC address is in the incorrect geographic location, identify the device associated with the MAC address and/or the particular wireless access point as unauthorized. The mesh server 108 may block or discontinue service to the device associated with that MAC address and/or to the particular access point.

In some embodiments, the mesh server 108 may receive a MAC address of an access point (e.g., a first access point) from the access point and/or other access points that detected the access point. The mesh server 108 may determine an estimated geographic location of the MAC address based on the generated map. The mesh server 108 may compare the estimated geographic location with the user's location information (e.g., the geographic location of access point stored in a database of the headend). If the estimated geographic location and the stored geographic information are not within a predefined distance, the mesh server 108 may compare the MAC address with another detected and/or received MAC address of another access point (e.g., a second access point). If the MAC address match, the mesh server 108 may identify and/or flag the first access point as being a potentially unauthorized access point spoofing the second access point.

Figure 5:
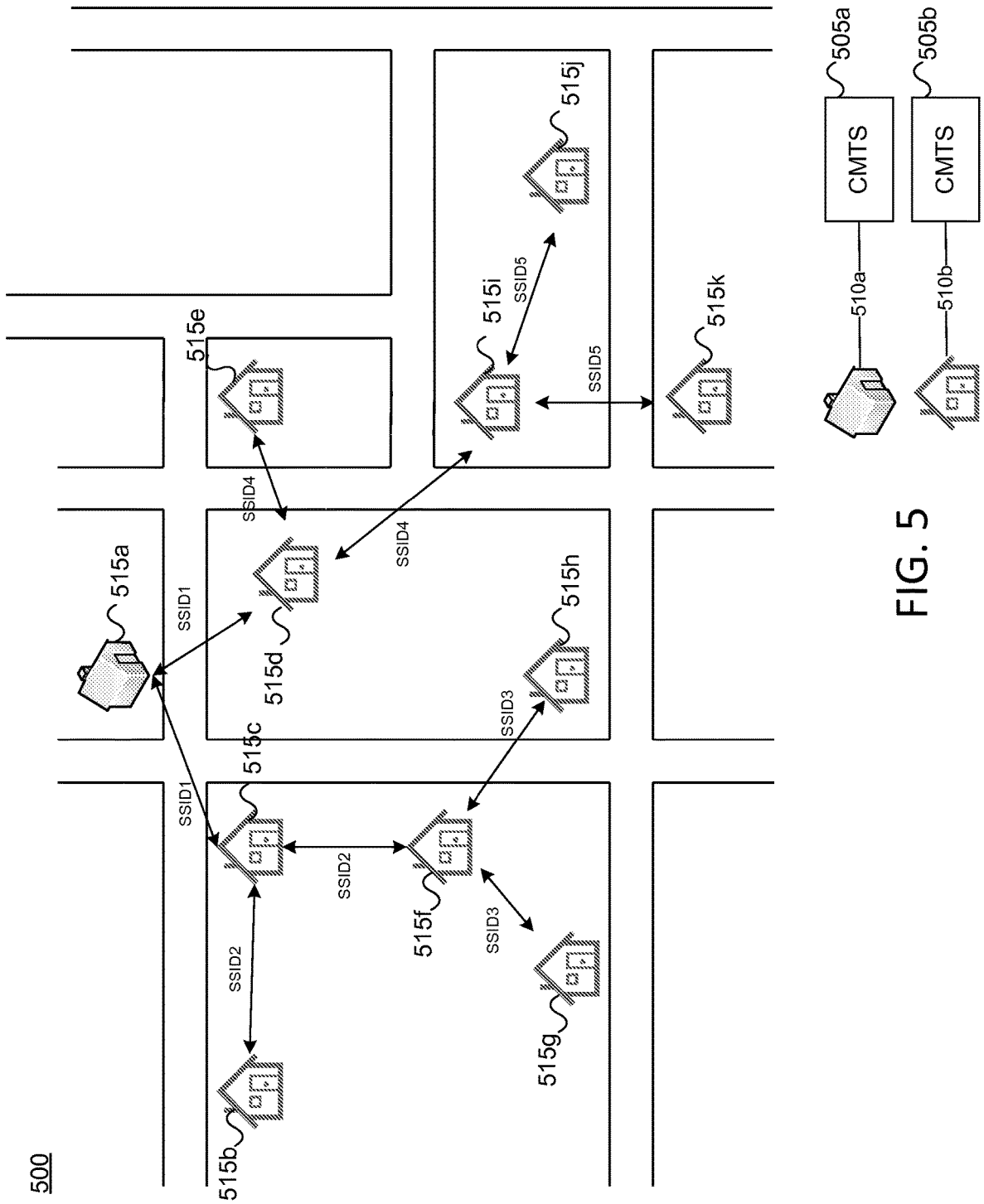
FIG. 5 illustrates an exemplary system for establishing a wireless network in accordance with one or more illustrative aspects discussed herein.

FIG. 5 illustrates an exemplary system for connecting a wireless network in accordance with one or more illustrative aspects discussed herein. The system 500 may include a first CMTS 505a connected to access point 515a via a first line 510a. The system 500 may include a second CMTS 505b connected to access points 515b-k via a second line 510b. The first CMTS 505a and/or the first line 510a may be referred to as a first distribution network. The second CMTS 505b and/or the second line 510b may be referred to as a second distribution network.

A failure or a loss in network connectivity at portion(s) of the distribution network(s) may result in one more access points (e.g., access points 515a-k) losing network connectivity with the central office 103 over their respective distribution network (e.g., a CMTS and/or a line). In some instances, the failure may be caused by a natural disaster, an accident, an attack, construction, or any other event. For example, a CMTS (e.g., the second CMTS 505b) may be destroyed or may be temporarily unavailable after an earthquake. For example, a line (e.g., the second line 510b) may have been accidentally cut during construction of a new building. In either instance, one or more access points 515b-k may lose network connectivity with the second CMTS 505b due to e.g., a cut in the second line 510b or because the second CMTS 505b is unavailable.

In such instances, the mesh server 108 may initiate a process to establish a wireless network between the multiple access points 515a-k to maintain service to those access points 515a-k as will be discussed in further detail in FIG. 6 below. In other words, rather than using the second line 510b, an access point (e.g., access point 515g) may establish a wireless network connection with a series of access points 515a,c,f until the wireless connection reaches an access point 515a that has network connectivity back to a headend device (e.g., the first CMTS 505a). More specifically, as discussed above in FIG. 3, one or more of the access points 515a-k may have overlapping coverage areas enabling the access points 515a-k to communicate with one another wirelessly (e.g., via Wi-Fi bridging). The access points 515a-k may initiate communications with one another via a public SSID provided by the service provider send to each of the access points 515a-k. Thereafter, the access points 515a-k may initialize their own private SSIDs (e.g., private SSID1-5) to establish a wireless network (e.g., a wireless ad hoc Wi-Fi network) for use with future communications. In some embodiments, the access points 515*a-k* may communicate with another by using an emergency broadcast SSID different from the public SSID and the private SSIDs1-5. In such embodiments, each access point 515 may be preconfigured to use the emergency SSID when that access point 515 loses network connectivity with the headend device, for example, over the lines 510*a-b*.

In some embodiments, the mesh server 108 may initiate the process to establish a wireless network between the multiple access points 515*a-k* even in instances where there might not have been any connectivity loss (e.g., the second CMTS 505*b* and the second line 510*b* may be fully operational and providing network connectivity to the access points 515*b-k*). For example, the mesh server 108 may establish the wireless network to one or more designated access points, using a generated coverage map, to increase bandwidth and/or data speed to one or more particular access points as discussed above in FIG. 3.

While two CMTSs 505*a-b* are shown, there may be more than two CMTSs. Additionally, while each of the access points 515*b-k* have lost network connectivity, in some embodiments, some of the access points (e.g., access points 515*b* and 515*i*) may have network connectivity while the other access points (e.g., access points 515*c*, 515*d-h,j-k*) may have lost network connectivity.

Figure 6:
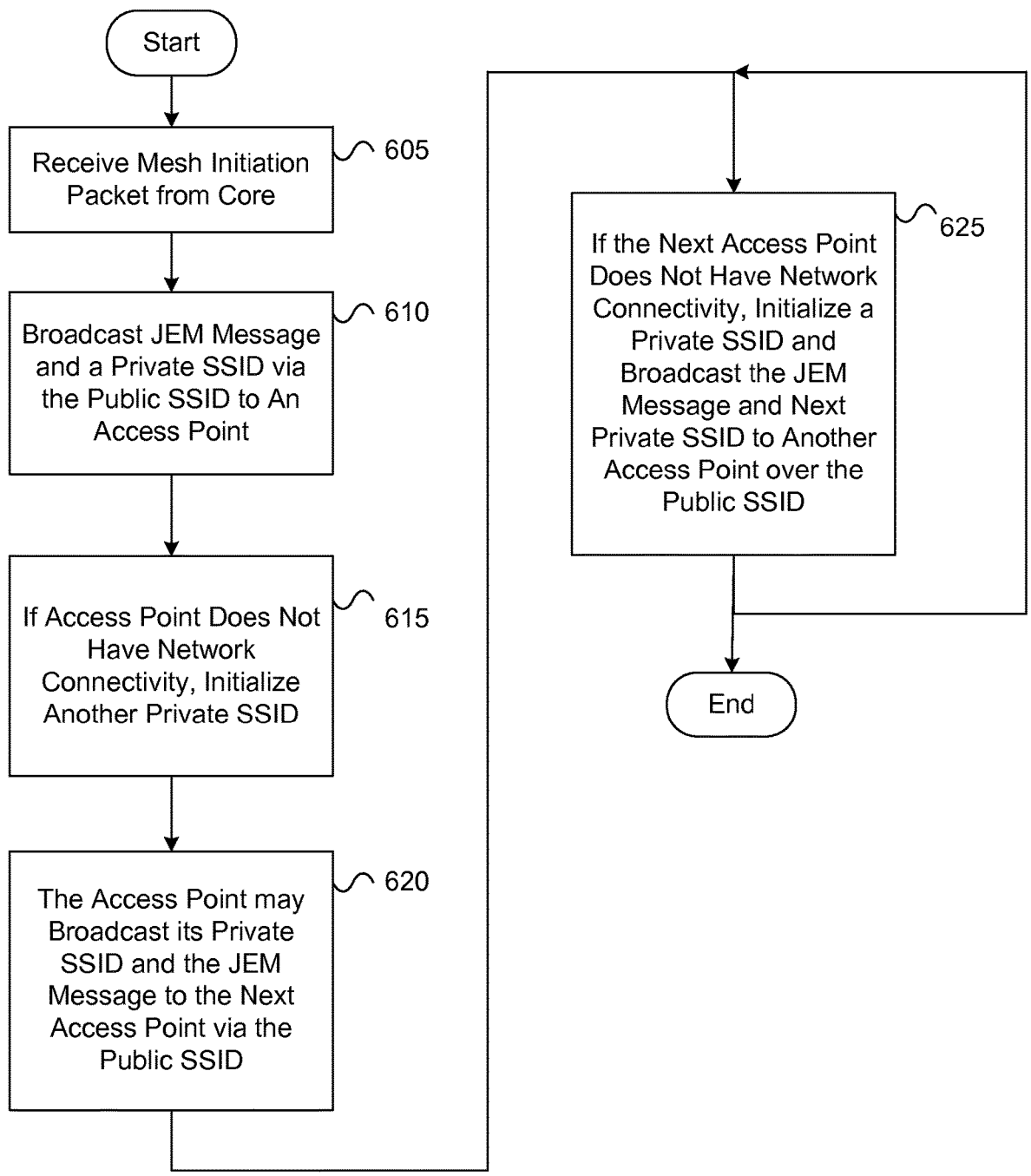
FIG. 6 illustrates a flowchart of an exemplary method for establishing a wireless network in accordance with one or more illustrative aspects discussed herein.

FIG. 6 illustrates a flowchart of an exemplary method for establishing a wireless network in accordance with one or more illustrative aspects discussed herein. In one or more embodiments, the method of FIG. 6 and/or one or more steps thereof may be performed by a computing device (e.g., computing device 200). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 605 in which a first access point (e.g., access point 515*a*) may receive from a core (e.g., a headend device such as the first CMTS 505*a*) a mesh initiation packet via a public SSID of the service provider provided to the access points 515*a-k*. In this exemplary embodiment, the second distribution network including the second CMTS 505*b* may be temporarily unavailable. As a result, the first CMTS 505*a* might not be able to send the mesh initiation packet to access points 515*b-k* because access points 515*b-k* may have lost network connectivity with the first CMTS 505*a*.

The mesh initiation packet may include a join emergency mesh (JEM) message. The JEM message may include instructions and/or a protocol to build the wireless network (e.g., an ad hoc wireless network) among the access points 515*a-k*. For example, the JEM message may instruct each of the access points 515*a-k* to create or initiate a private SSID for use with the wireless network and/or may instruct the access point to use an emergency SSID. The JEM message may instruct each of the access points 515*a-k* to broadcast the JEM message and their respective private SSID1-5 using the public SSID. In some embodiments, the JEM message may specify which access points the JEM message is to be sent. In some embodiments, the JEM message may include identifiers of access points that have lost their network connectivity to the headend device.

In step 610, an access point 515*a* with network connectivity to the headend may broadcast the JEM message and its private SSID using the public SSID provided by the service provider. For example, in step 610, in response to receiving the mesh initiation packet, access point 515*a* may initialize (or initiate use of) its private SSID1. The private SSID1 may be created locally by the access point 515*a*, or the access point 515*a* may have received the private SSID1 at some point from the headend device and stored the private SSID1 in network storage of access point 515*a*. Because the access point 515*a* may have an overlapping coverage area with access points 515*c-d*, the access points 515*c-d* may receive, using the public SSID, the broadcasted JEM message and private SSID1 from the access point 515*a*.

As a result of receiving the private SSID1 from the access point 515*a*, the access points 515*c* and 515*d* may establish a wireless connection with access point 515*a* to receive service (e.g., a transport stream) from a headend device through access point 515*a*. More specifically, the access point 515*a* may receive the transport stream from the first CMTS 505*a* and may forward the transport stream to the access points 515*c-d* over the wireless network (i.e., the emergency communication mesh) using private SSID1. Further, access points 515*c-d* may transmit requests upstream to the first CMTS 505*a*. For example, the access points 515*c-d* may transmit requests to the access point 515*a* over the wireless network using private SSID1 and the access point 515*a* may forward the request to the first CMTS 505*a* via the first line 510*a*.

In step 615, if an access point does not have network connectivity to the headend device, then the access point may initialize its own private SSID. For example, in step 615, after receiving the JEM message, the access point 515*c* may determine that it does not have network connectivity to the second CMTS 505*b* and may, in response, initialize (or initiate use of) its private SSID2. The private SSID2 may be created locally by the access point 515*c*, or the access point 515*c* may have received private SSID2 at some point from the headend device and stored the private SSID2 in network storage of access point 515*c*.

Similarly, after receiving the JEM message, the access point 515*d* may determine that it does not have network connectivity to the second CMTS 505*b* and may, in response, initialize private SSID4. In some embodiments, the access point 515*c* may send its private SSID2 to the access point 515*a*. Similarly, in some embodiments, the access point 515*d* may send its private SSID4 to the access point 515*a*.

In step 620, the access point may broadcast its private SSID and the JEM message to the next access point using the public SSID. For example, in step 620, the access point 515*c* may have an overlapping coverage area with access points 515*b,f*. Thus, the access points 515*b,f* may receive, using the public SSID, the broadcasted JEM message and the private SSID2 from the access point 515*c*. As a result of receiving the private SSID2 from the access point 515*c*, the access points 515*b,f* may establish a wireless connection with the access point 515*c* to receive service (e.g., a transport stream) from the headend device through the access points 515*a,c*. More specifically, the access point 515*a* may receive the transport stream from the first CMTS 505*a* and may forward the transport stream to the access point 515*c* over the wireless network (i.e., the emergency communication mesh) using private SSID1. The access point 515*c* may then forward the transport stream to the access point 515*b* using the private SSID2. The access point 515*b* may send a request to the first CMTS 505*a*. For example, the access point 515*b* may send the request to the access point 515*c* using private SSID2, access point 515*c* may forward the request to access point 515*a* using private SSID1, and the access point 515*a* may send the request to the first CMTS 505a via the first line 510a. The access point 515f may receive the transport stream and send requests in a similar manner.

In step 625, if the next access point does not have network connectivity to the headend device, then the next access point may initialize its own private SSID and may broadcast the private SSID and the JEM message to another access point using the public SSID. For example, in step 625, after receiving the JEM message, the access point 515f may determine that it does not have network connectivity to the second CMTS 505b and may, in response, initialize private SSID3. The access point 515f may broadcast the private SSID3 and the JEM message to the next access point using the public SSID. For example, the access point 515f may have an overlapping coverage area with access points 515g-h. Thus, the access points 515g-h may receive, using the public SSID, the broadcasted JEM message and the private SSID3 from the access point 515f.

Similarly, after receiving the JEM message, the access point 515i may determine that it does not have network connectivity to the second CMTS 505b and may, in response, initialize private SSID5. The access point 515i may broadcast the private SSID5 and the JEM message to the next access point using the public SSID. For example, the access point 515i may have an overlapping coverage area with access points 515j-k. Thus, the access points 515j-k may receive, using the public SSID, the broadcasted JEM message and the private SSID5 from the access point 515i.

Step 625 may be repeated until there are no more access points with an overlapping coverage with any of the access points 515a-k. Thus, the access points 515a-k that are each a part of the emergency communication mesh (e.g., the ad hoc wireless network). By using the wireless network, access points 515a-k may continue to provide service to users of the service provider even when access points 515b-k lose network connectivity to the second CMTS 505b.

Referring back to FIG. 5, each of the access points 515a-k may instantiate a dynamic host configuration protocol (DHCP) and/or some other protocol so that each of the access points 515a-k may become a server for other connected access point 515a-k. Each of the access points 515a-k may act as a proxy for other connected access points 515a-k to create an ad hoc routing tree.

The access point 515a may be connected to the first CMTS 505a and access points 515b-k may be connected to the second CMTS 505b. In other words, the access point 515a may be assigned to the first CMTS 505a and the access points 515b-k may be assigned to the second CMTS 505b. As a result of the emergency communication mesh, in some embodiments, one or more access points 515b-k assigned to the second CMTS 505b may be connected to and may communicate with the first CMTS 505a (instead of or in addition to the second CMTS 505b). Particularly, the one or more access points 515b-k may communicate with first CMTS 505a through one or more intermediate access points including, for example, the access point 515a.

In one or more embodiments, in response to a determination by one or more of the access points 515b-k that the one or more access points 515b-k has network connectivity to the headend device over the second distribution network (e.g., has regained network connectivity to the second CMTS 505b via the second line 510b), those particular access points may send an indication of such network connectivity to the mesh server 108 using the emergency communication mesh and/or the second distribution network. The mesh server 108 may identify those access points as egress access points and may initiate a process to establish one or more additional wireless networks different from the first wireless network by sending to those egress access points the mesh initiation packet. In some embodiments, the mesh initiation packet may specify which access points may connect to the respective wireless network. In some embodiments, the mesh server 108 might not identify one of those particular access points as an egress access point because although that particular access point may have detected that it has regained network connectivity to e.g., a CMTS, there may be a fiber cut or connectivity lost at some point upstream from that CMTS. As a result, even if that particular access point connected with that CMTS, the particular access point might not receive service. In such embodiments, the mesh server 108 may send to the particular access point an instruction to continue to use the emergency communication mesh and not its assigned distribution network. The mesh server 108 may send the instruction to the particular access point via an egress access point and the emergency communication mesh. Accordingly, the particular access point may continue to use the wireless network even after the particular access point establishes network connectivity to its assigned CMTS (e.g., a headend device).

In one or more embodiments, an emergency mesh network may be created using a repetitive discovery protocol. In such embodiments, while the distribution networks were functioning (e.g., when the access points 515a-k had network connectivity to the headend device over their respective distribution networks), the mesh server 108 may distribute the emergency mesh network plan to the access points 515a-k. In other words, the mesh server 108 may send to the access points 515a-k an instruction to, after a loss of connectivity for a predetermined period of time, periodically interrogate whether a geographically adjacent access point has a connection to a headend device (e.g., through the emergency wireless mesh network), and connect to the geographically adjacent access point (e.g., by bridging Wi-Fi connections) once that geographically adjacent access point establishes a connection to the head device.

The emergency mesh network plan may identify, for each of the access points 515a-k, one or more of the other access points 515a-k to connect to in the event of a network outage. The emergency mesh network plan may specify for a particular access point (e.g., access point 5150 an order of the neighboring access points 515c,g-h with which to attempt connecting in order to connect to the emergency mesh network. For example, the emergency mesh network plan may specify that access point 515f may first attempt to connect to access point 515c. If the access point 515f is unable to connect to the emergency mesh network after waiting a predetermined period of time, then the emergency mesh network plan may specify that access point 515f may next attempt to connect to the access point 515h in an attempt to connect to the emergency mesh network.

In some instances, if the access point 515f loses network connectivity to the headend device (e.g., the second CMTS 505b), the access point 515f may wait for a predetermined period of time. If the access point 515f has not regained network connectivity after the predetermined period of time has expired, then the access point 515f may, using the emergency mesh network plan, connect to assigned neighboring access points (e.g., access point 515c and access point 515h) using either a public SSID and/or an emergency backup SSID. Specifically, the access point 515f may send to access point 515c a request inquiring whether the access point 515c has network connectivity to a headend device either directly through its assigned distribution network or indirectly through the emergency mesh network. In response to receiving an indication from the access point 515c that access point 515c does not have network connectivity to a headend device or after waiting a predetermined period of time, the access point 515f may send to access point 515h a request inquiring whether the access point 515h has network connectivity to a headend device either directly through its assigned distribution network or indirectly through the emergency mesh network. In response to receiving an indication from access point 515h that access point 515h does not have network connectivity to a headend device or after waiting a predetermined period of time, the access point 515f may, using the emergency mesh network plan, connect to any other specified and/or detected access point to attempt to connect to the emergency mesh network. In response to a determination that the access point 515f has been unable to connect to the emergency mesh network and after a predetermined period of time has expired, the access point 515f may retry connecting to the emergency mesh network in a similar manner as discussed above.

As a result of each of the access points 515b-k attempting to connect to the emergency mesh network using the repetitive discovery protocol, the emergency mesh network may eventually connect each of the access points 515a-k with a headend device. For example, the first time each of the access points 515b-k attempts to connect to the emergency mesh network, access points 515c-d may connect to the emergency wireless network. The next time each of the remaining access points 515b,e-k attempts to connect to the emergency mesh network, access points 515b,e-f,i may connect to the emergency wireless network. The next time each of the remaining access points 515g-h,j-k attempts to connect to the emergency mesh network, each of the remaining access points 515g-h,j-k may connect to the emergency mesh network.

In one or more embodiments, an access point that has lost network connectivity may initiate an emergency communication mesh after a predetermined time period has expired. For example, an originating access point (e.g., access point 515g) may have received from a headend device a JEM message, an emergency backup SSID, and/or one or more designated neighboring access points to connect to in the event of an outage. In some embodiments, the originating access point 515g may generate the JEM message. The JEM message may include an identifier of the originating access point 515g and an indication that the originated access point 515g does not have network connectivity to a headend device. In response to a determination that the originating access point 515g has lost network connectivity to the headend device via its assigned distribution network, the originating access point 515g may send to the one or more designated neighboring access points (e.g., access point 515f) a JEM message and its private SSID (e.g., a first private SSID) by using either a public SSID of the service provider or the emergency backup SSID. In instances where there the originating access point 515g might not have designated neighboring access points, the originating access point 515g may detect and/or otherwise discover any neighboring access points with which it has an overlapping coverage area and may send the JEM message and the first private SSID to those neighboring access points (e.g., access point 515f).

In response to receiving the JEM message and the first private SSID, a wireless network may be established between the originating access point 515g and the neighboring device 515f using the first private SSID. The neighboring access point 515f may determine whether it has network connectivity to a headend device either directly through its assigned distribution network or indirectly through a wireless network. If the neighboring access point 515f does not have any network connectivity, then the neighboring device 515f may increase a hop count included in the JEM message and add to the JEM message its own identifier and an indication that the neighboring access point does not have network connectivity to the headend device. Additionally, the neighboring access point 515f may initialize its own private SSID (e.g., a second private SSID) and may broadcast the JEM message and the second private SSID to either designated access points and/or detected access points.

The process may continue to repeat adding one or more additional intermediate neighboring points (e.g., access point 515c) extending the wireless network until the JEM message is received by an egress access point (e.g., access point 515a that still has network connectivity over its assigned distribution network and/or an access point that is part of a wireless network where at least one access point has network connectivity over its assigned distribution network). At that point, the egress access point 515a may forward communications between the headend device and the one of the intermediate neighboring points 515c, and those points may forward communications to other access points. As a result, the originated access point 515g, its neighboring access point 515f, the one or more additional intermediate access points 515c, the egress access point 515a, and the headend device may each communicate with one another.

Figure 7:
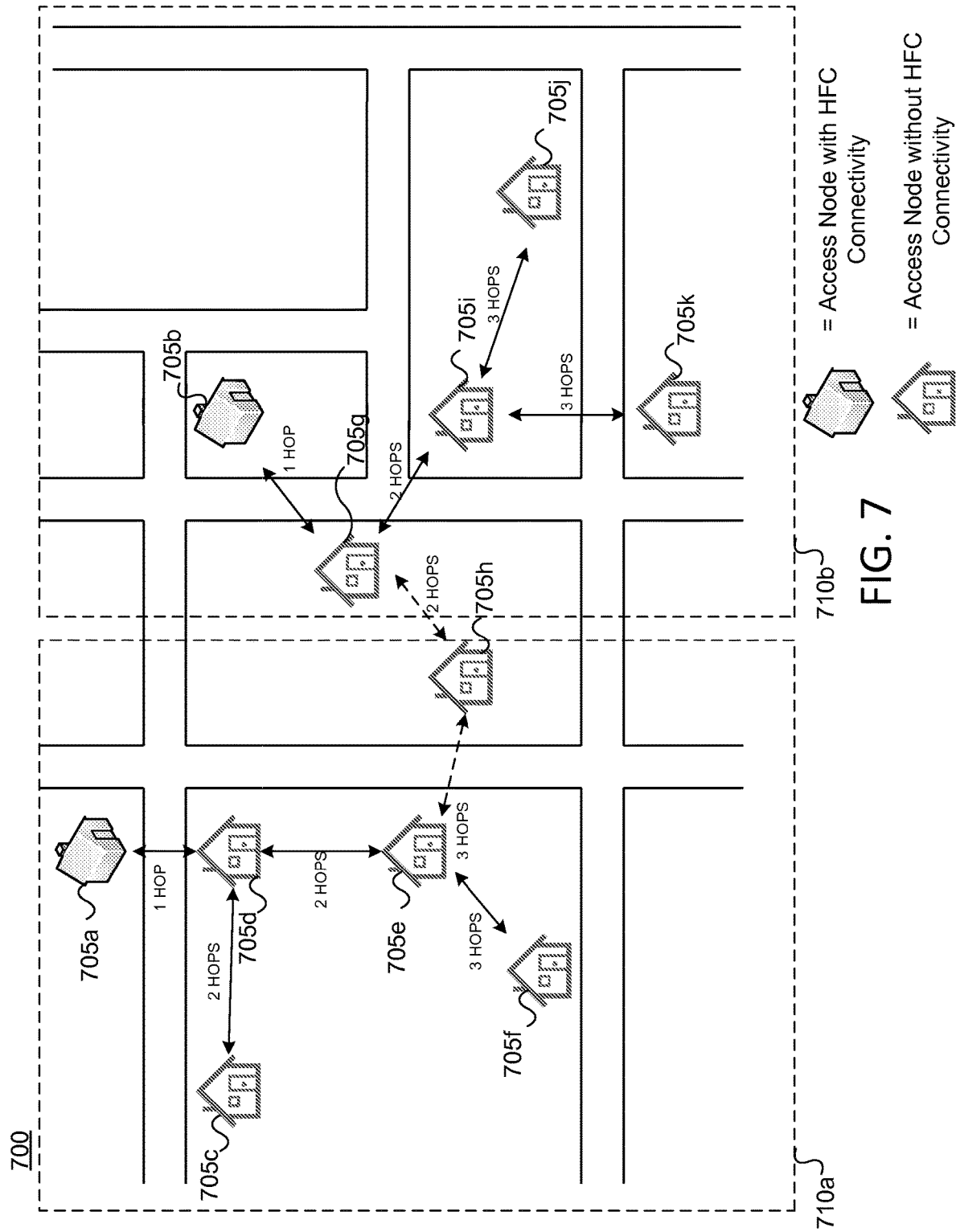
FIG. 7 illustrates an exemplary system for optimizing a wireless network in accordance with one or more illustrative aspects discussed herein.

FIG. 7 illustrates an exemplary system for optimizing a wireless network in accordance with one or more illustrative aspects discussed herein. The system 700 may include access points 705a-k connected via one or more lines (not shown) to a headend device (not shown). The access points 705a-b may have network connectivity to the headend device through one or more distribution networks as discussed herein. The access points 705a-b may also be referred to as egress access points. The access points 705c-k might not have network connectivity to the headend device through the one or more distribution networks.

Figure 8:
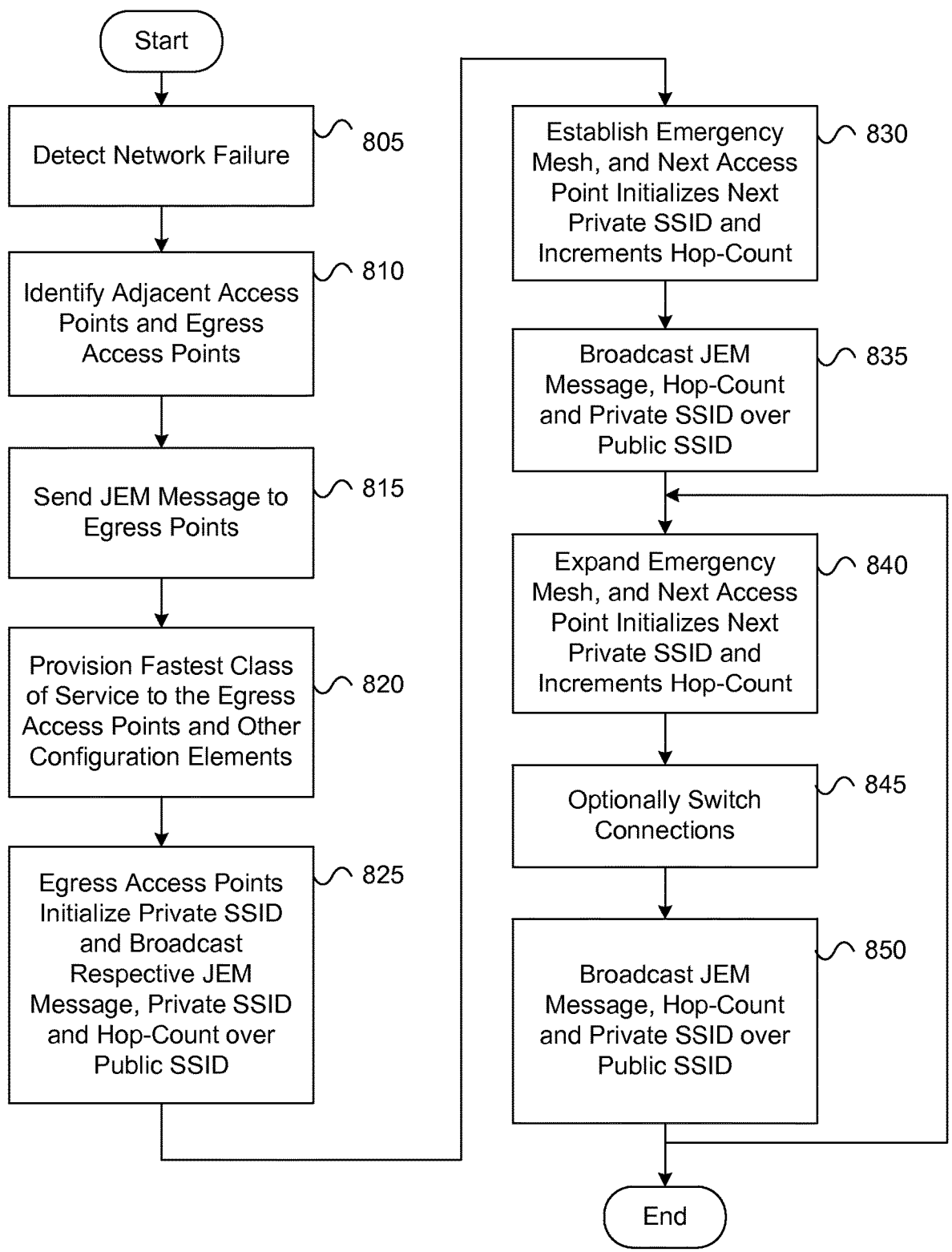
FIG. 8 illustrates a flowchart of an exemplary method for optimizing a wireless network in accordance with one or more illustrative aspects discussed herein.

FIG. 8 illustrates a flowchart of an exemplary method for optimizing a wireless network in accordance with one or more illustrative aspects discussed herein. In one or more embodiments, the method of FIG. 8 and/or one or more steps thereof may be performed by a computing device (e.g., computing device 200). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a mesh server 108 and/or one or more access points 705a-k may detect a network failure. For example, in step 805, the network failure may be the result of a disaster, attack, accident, or the like. The network failure may be a loss of network connectivity to one or more portions of the network (e.g., the HFC lines) of the service provider. The mesh server 108 and/or one or more access points 705a-k may detect a network failure by, for example, receiving an indication of a network failure from another device or a user, detecting a loss of network connectivity for a predetermined period of time, etc.

In step 810, the mesh server 108 may identify adjacent access points and egress access points. For example, the mesh server 108 may identify adjacent access points by using a generated wireless coverage map (as discussed above in FIG. 3) and identifying those access points that have an overlapping wireless coverage area as adjacent access points. For example, access point 705*a* may be identified as adjacent to access point 705*d* when access point 705*a* and access point 705*d* have an overlapping wireless coverage area. The mesh server 108 may also identify egress access points 705*a-b* using the generated wireless coverage map and sending requests to verify network connectivity to one more access points 705*a-k*. In response, the mesh server 108 may receive from the egress access points 705*a-b* a verification message that the egress access points 705*a-b* have network connectivity with the headend device via one or more distribution networks (e.g., a DOCSIS network). The mesh server 108 might not receive a verification message from the access points 705*c-k* when access points 705*c-k* have lost network connectivity with the headend device via the one or more distribution networks.

In step 815, the mesh server 108 may send a JEM message to a respective one or more of the egress access points 705*a-b*. For example, a first JEM message may include instructions for the egress access points 705*a* to begin establishing an emergency mesh network (e.g., a Wi-Fi bridging network). The first JEM message may designate which access points 705*a-k* and in what order the first JEM message is to be sent or forwarded to those access points 705*a-k*. Similarly, the mesh server 108 may send to egress access point 705*b* a second JEM message different from the first JEM message. The second JEM message may be configured in a similar manner as the first JEM message.

In step 820, the mesh server 108 may provision the fastest class of service to the egress access points 705*a-b* and any other configuration elements. For example, in step 820, the mesh server 108 may remove any bandwidth capacity, data speed, and/or throughput limitations from egress access points 705*a-b*. Consequently, the egress access points 705*a-b* may be provisioned to utilize a maximum bandwidth, data speed, and/or throughput of the one or more distribution networks (e.g., the HFC lines). The other configuration elements may include dedicating more routers in the backplane to a CMTS connected to the egress access points 705*a-b*. These routers may route transit data between the CMTS and the egress access points 705*a-b*.

In step 825, the egress access points 705*a-b* may each respectively initialize a private SSID and respectively broadcast the JEM message, the private SSIDs, and a hop-count using the public SSID. For example, in step 825, the egress access point 705*a* may initialize its own private SSID by either locally generating the private SSID or retrieving it from network storage. The egress access point 705*a* may broadcast the first JEM message, its own private SSID, and a first hop-count using the public SSID provided by the service provider. The egress access point 705*a* may broadcast this information either to access points specified in the first JEM message (e.g., access point 705*d*) and/or a detected access point (not shown). A detected access point may be any access point having an overlapping wireless coverage range with the egress access point 705*a*, thereby enabling wireless communication between the detected access point and the egress access point 705*a*.

Similarly, the egress access point 705*b* may initialize its own private SSID by either locally generating the private SSID or retrieving it from network storage. The egress access point 705*b* may broadcast the second JEM message, its own private SSID, and a second hop-count using the public SSID provided by the service provider. The egress access point 705*b* may broadcast this information to the access points specified in the second JEM message (e.g., access point 705*g*) and/or a detected access point (not shown).

In step 830, one or more emergency wireless meshes may be established and next access points (e.g., access point 705*d,g*) may initialize their own private SSID and may each increment their respective hop-count. For example, in step 830, the access point 705*d* may receive from the egress access point 705*a* the first JEM message, the first hop-count, and the private SSID of the egress access point 705*a* using the public SSID. A first emergency wireless mesh (e.g., a first ad hoc wireless network) may be established by bridging the wireless (e.g., Wi-Fi) connections of the egress access point 705*a* and the access point 705*d*. The egress access point 705*a* and the access point 705*d* may communicate with one another using the private SSID of the egress access point 705*a*. The access point 705*d* may initialize its own private SSID by either locally generating the private SSID or retrieving it from network storage. The access point 705*d* may increment the first hop-count by one (e.g., from zero to one hop).

Similarly, the access point 705*g* may receive from the egress access point 705*b* the second JEM message, the second hop-count, and a private SSID of the egress access point 705*b* using the public SSID. A second emergency wireless mesh (e.g., a second ad hoc wireless network) may be established by bridging the wireless (e.g., Wi-Fi) connections of the egress access point 705*b* and the access point 705*g*. The second emergency mesh may be different from the first emergency mesh. The egress access point 705*b* and the access point 705*g* may communicate with one another using the private SSID of the egress access point 705*b*. The access point 705*g* may initialize its own private SSID by either locally generating the private SSID or retrieving it from network storage. The access point 705*g* may increment the second hop-count by one (e.g., from zero to one hop).

In step 835, the access points 705*d,g* may broadcast their respective JEM message, hop-count, and private SSID. For example, in step 835, the access point 705*d* may broadcast the first JEM message, the first hop-count, and the private SSID of the access point 705*d*. The access point 705*d* may broadcast this information to the access points specified in the first JEM message (e.g., access point 705*c*) and/or a detected access point (e.g., access point 705*e*), using the public SSID provided by the service provider. The first JEM message may specify whether to connect to a detected access points or designated access points.

Similarly, the access point 705*g* may broadcast the second JEM message, the second hop-count, and the private SSID of the access point 705*g*. The access point 705*g* may broadcast this information to the access points specified in the second JEM message (e.g., access point 705*i*) and/or a detected access point using the public SSID provided by the service provider. The second JEM message may specify whether to connect to a detected access points or designated access points.

In step 840, the one or more emergency meshes may be expanded and the next access points may initialize their own private SSID and increment their respective hop-count. For example, in step 840, the access points 705*c,e* may receive the first JEM message, the first hop-count, and the private SSID of the access point 705*d*. The first emergency mesh may be expanded (e.g., joined) by bridging the wireless (e.g., Wi-Fi) connections of the access point 705*d* and the access point 705*e*. The access point 705*d* and the access point 705*e* may communicate with one another using the private SSID of the access point 705*d*. The first emergency mesh may be expanded by bridging the wireless connections of the access point 705*d* and the access point 705*c*. The access point 705*d* and the access point 705*c* may communicate with one another using the private SSID of the access point 705*d*. The access point 705*c* may initialize its own private SSID and may increment the first hop-count by one (e.g., from one to two hops). The access point 705*e* may also initialize its own private SSID and may increment the first hop-count by one (e.g., from one to two hops).

Similarly, the access points 705*i* may receive the second JEM message, the second hop-count, and the private SSID of the access point 705*g*. The second emergency mesh may be expanded (e.g., joined) by bridging the wireless (e.g., Wi-Fi) connections of the access point 705*g* and the access point 705*i*. The access point 705*g* and the access point 705*i* may communicate with one another using the private SSID of the access point 705*g*. The access point 705*i* may initialize its own private SSID and may increment the second hop-count by one (e.g., from one to two hops).

In step 845, the access points may optionally switch connections to optimize the one or more emergency meshes. For example, in step 845, each access point that has lost connectivity through its distribution network and that is a part of an emergency mesh may evaluate any other emergency meshes to determine whether that access point should switch to another emergency mesh. For example, the access point 705*e* may receive a JEM message, hop-count, and a private SSID from one of the access points of the other emergency meshes (e.g., a third emergency mesh). The access point 705*e* may increment the hop-count received from the third emergency mesh and may compare that hop-count with the first hop count associated with the first emergency mesh. If the first hop-count is lower than the hop-count associated with the third emergency mesh, the access point 705*e* may maintain its current connection to the first emergency network. If the first hop-count is greater than the hop-count associated with the third emergency mesh, the access point 705*e* may disconnect from its current emergency mesh and join the other emergency mesh via another access point. The access point 705*e* may also switch emergency meshes based on, for example, the other emergency mesh having a greater bandwidth, higher data speed, greater throughput, and the like.

In step 850, the access point 705*e,i* may broadcast their respective JEM message, hop-count, and private SSID in a similar as discussed above e.g., in step 835. The steps 840-850 may be repeated until each of the access points 705*a-k* are a part of an emergency mesh.

In an exemplary embodiment, the access point 705*h* may, in step 840, receive from the access point 705*e* the first JEM message, the first hop-count and a private SSID of the access point 705*e*. The access point 705*h* may, in step 840, expand (e.g., join) the first emergency mesh by bridging the wireless (e.g., Wi-Fi) connections of the access point 705*e* and the access point 705*h*. The access point 705*h* may increment the first hop-count by one (e.g., from two to three hops). At a later time, the access point 705*h* may, in step 840, receive from access point 705*g* the second JEM message, the second hop-count and a private SSID of the access point 705*g*. The access point 705*h* may increment the second hop-count by one (e.g., from one to two hops). In step 845, the access point 705*h* may compare the first hop-count and the second hop-count. Because the second hop-count (e.g., two hops) is less than the first hop-count (e.g., 3 hops), the access point 705*h* may disconnect from the first emergency mesh (i.e., disconnecting from access points 705*a,c-d,e-f*) and may connect to (e.g., join) the second emergency mesh (i.e., 705*b,g,i-k*) by bridging its wireless connection with the wireless connection of access point 705*g*.

Referring back to FIG. 7, the access point 705*h* may also switch emergency meshes based on, for example, the second emergency mesh having a greater bandwidth, higher data speed, and/or greater throughput than that of the first emergency mesh. In some embodiments, the access point 705*h* may switch emergency meshes based on a least distance routing algorithm associated with shortest path back to a headend device (e.g., a CMTS). In some embodiments, the access point 705*h* may switch emergency meshes based on an open shortest path first (OSPF) algorithm, a border gateway protocol (BGP) algorithm, a hop-count trace routing protocol, or the like. The access point 705*a-k* may be configured to use one or more of the above algorithms or may receive signals to implement such algorithms. In some embodiments, an access point (e.g., the access point 705*e*) may receive a signal indicating that service has been restored to the access point 705*f* along with instructions to connect to the access point 705*f* for service.

In some embodiments, the access point 705*h* might not switch to the second emergency mesh even if it would result in a lower hop-count because the second emergency mesh might have a lower bandwidth, data speed, and/or throughput than that of the first emergency mesh. In some embodiments, the access point 705*h* might not switch to the second emergency mesh if the access point 705*h* has been pre-designated to be a part of the first emergency mesh. In some embodiments, the access point 705*h* might not switch to the second emergency mesh if it is not part of an emergency service area to which the access point 705*h* has been assigned.

In some embodiments, each of the access points 705*a-k* may include a hardware-level network rebuild component. In such embodiments, the rebuild component may aid each of the access points 705*a-k* to determine its state or mode (e.g., an emergency mesh mode) and whether there is network connectivity over the distribution network (e.g., network connectivity over the HFC plant). Further, the rebuild component may have additional tuning capabilities in the radio to sense and receive the strongest adjacent access point broadcast signals.

In one or more embodiments, the mesh server 108 may establish multiples emergency search areas (ESAs), such as, for example, a first ESA 710*a* and a second ESA 710*b*. Each ESA 710*a-b* may be respectively associated with a first emergency mesh and a second emergency mesh. Each ESA 710*a-b* may include one or more access points, one or more lines (e.g., fiber nodes), one or more headend devices (e.g., CMTSs), one or more switches, and/or the like. The mesh server 108 may limit the total number of access points in any given ESA so that each access point may have a throughput above a predetermined threshold and/or reduce bottlenecks below a predetermined throughput. In other words, the mesh server 108 may send an instruction to one or more access points to prevent one or more particular access points from joining a particular emergency mesh. For example, the mesh server 108 may send an instruction to access point 705*g* to prevent access point 705*h* from joining the second wireless mesh because access point 705*h* is assigned to the first ESA 710*a* and access point 705*g* is assigned to the second ESA 710*b*. As a result, when the access point 705*h* attempts to join and/or switch to the second emergency mesh, the access point 705*g* may reject the request to join and/or connect to the access point 705*g* to join the second emergency mesh. In some embodiments, the mesh server 108 may determine how many and which access points are in a particular ESA based on an anticipated and/or actual amount of data or voice traffic, amount of connections (e.g., hops), and the like.

In some embodiments, adjacent ESAs may be joined where the scope of affected service is large enough (e.g., beyond a predetermined threshold). For example, the first ESA 710a may be joined with the second ESA 710b to maintain a bandwidth or throughput above a predetermined threshold for access point 705f.

In one or more embodiments, the access points 705a-k (e.g., a set-top box, eDVA, Wi-Fi hotspot, etc.) may receive from the mesh server 108 an emergency mode configuration. The access points 705a-k may receive the emergency mode configuration via the distribution network and/or an emergency wireless mesh. The access points 705a-k may receive the emergency mode configuration before, during, and/or after a network failure. In some embodiments, when one or more access points 705a-k detect a loss of network connectivity over its assigned distribution network (e.g., default HFC lines) for a predetermined time period, the access points 705a-k may switch from a default mode to an emergency mode (i.e., trigger an emergency mode). In some embodiments, the emergency mode may be triggered by the mesh server 108 by sending an emergency mode signal to the egress access points 705a-b and then the emergency mode signal may be forwarded by the access points 705a-k until each of the access points 705a-k receives the emergency mode signal. In some embodiments, the emergency mode signal may include the emergency mode configuration. In some embodiments, simultaneously, a session initiated protocol (SIP), network-based calling signaling (NCS), media gateway control protocol (MGCP), and/or simple network management protocol (SNMP) message may be broadcast by the mesh server 108 to all reachable access points 705a-k to switch them into emergency mode.

The emergency mode configuration may include an emergency SSID for use by the access points 705a-k in bridging their wireless connection with one another to establish one or more emergency meshes. The emergency SSID may be different from a public SSID provided by the service provider and a private SSID of each of the access points 705a-k. After switching to the emergency mode, the access points 705a-k may search for or detect other access points broadcasting the emergency SSID and connect to them. In some embodiments, the emergency mode configuration may include a low power mode. In such embodiments, if an access point (e.g., the access point 705d) detects that it is no longer receiving power either through the HFC lines and/or another external power source, then the access point 705d may preserve power by disabling the access point's 705d cable modem and line cards to extend the battery life of the access point 705d as long as possible. The access point 705d may continue to use power to maintain a wireless connection with adjacent access points 705a,c,e. The access point 705d may continue to provide a wireless connection even if the access point 705d (e.g., an eDVA) has been completely dislocated from the residence or business (for example, the access point 705d is now in the front yard). The access point 705d may continue to operate on battery power and may continue to remain connected to the first emergency mesh. In some embodiments, consumer premise equipment (e.g., tablet, computers, cell phones, etc.) may receive the emergency mode configuration. In such embodiments, once the access point 705d exhausts the power from its battery, these devices at the same premise or location as access point 705d may connect to adjacent access points 705a,c,e using the emergency SSID. In some embodiments, these devices may download a service provider app associated with the emergency service.

The access points 705a-k, when in emergency mode, may limit the amount of traffic and/or prioritize the type of traffic going through the access points 705a-k to maintain throughput above a predetermined threshold for the emergency meshes. For example, the access point 705d may block requests for a first content type (e.g., from the access point 705e) and may permit requests for a second content type different from the first content type (e.g., from the access point 705e). For example, the access point 705d may block requests associated with games, movies, and/or other media but may permit (e.g., forward) requests for emergency services and critical applications.

Further, the access points 705a-k, when in emergency mode, may limit the types of devices that the access points 705a-k will let transmit and/or receive data in order to maintain throughput above a predetermined threshold for the emergency meshes. For example, the access point 705e may be connected to multiple consumer premise devices. For example, the access point 705e may have a gaming console, a set-top box, a computer, a tablet, or the like connected to its Wi-Fi hotspot at the access point 705e. Each device may include a media access control (MAC) address and may be located, along with the access point 705e, at the user's residence. The access points 705a-k may identify the devices based on their MAC addresses. For example, the access points 705a,d-e may identify a particular gaming device based on an organizationally unique identifier (OUI) (e.g., the first six digits) of its MAC address. At least one of the access points 705a,d-e may prevent and/or block requests to a headend device from a first device (e.g., the gaming console) of the user but may permit (e.g., forward) requests to the headend device from a second device (e.g., the set-top box) of the user.

As the service comes back up (e.g., as access points regain connectivity through the distribution HFC network), the mesh server 108 may update the one or more of the emergency meshes and the ESAs 710a-b to permit greater overall throughput to the access points 705a-k. For example, the access point 705i may regain its network connectivity over the HFC lines. In response, the mesh server 108 may identify access point 705i as an egress access point. In some embodiments, the mesh server 108 may expand the second ESA 710b to also include access points 705e-f,h because the second ESA 710b has an additional egress access point. The mesh server 108 may contract the first ESA 710a so that it might not include access points 705e-f,h. In some embodiments, the mesh server 108 may establish a third ESA associated with access points 705i-k and may contract the second ESA 710b so that it might not include access points 705i-k. In some embodiments, the mesh server 108 may also update the priority of content and devices. For example, the mesh server 108 may signal to one or more access points 705a-k to now permit gaming content and requests from gaming consoles. In some embodiments, the access points 705a-k may continue to block certain types of content (e.g., high definition content) and/or particular types of devices that use above a predetermined threshold of bandwidth.

In one or more embodiments, the mesh server 108 may send to one or more of the access points 705a-k an instruction to propagate broadcast messages to other access points 705a-k. As a result, as each of the access points 705a-k becomes a part of one of the emergency meshes, those access points 705a-k may send messages (e.g., alert messages) to one or more of the other access points 705a-k.

Further, the mesh server 108 may send messages to the one or more access points 705a-k and may receive messages from the one or more access points 705a-k. The message may be initiated by one of the access points 705a-k and/or the mesh server 108. The messages may be transmitted by the access points 705a-k using the emergency SSID and/or a respective private SSID of the particular access point. When the message is received by one of the access points 705a-k, that particular access point may output the message to one of the consumer premise devices (e.g., a computer, set-top box, etc.) connected with the particular access point so that these devices may display the alert message to the user. The particular access point may forward (e.g., relay) the alert message to other access points.

The mesh server 108 may identify any access point that might not be connected to an emergency mesh (using e.g., the generated contour map) and may send that access point the alert message over another network (e.g., a cellular network). Additionally or alternatively, the mesh server 108 may identify an area near that access point at which a mobile vehicle of the service provider may be placed in order to connect that access point to the emergency mesh.

Each of the access points 705a-k may send an emergency communication packet to one or more consumer premise devices (e.g., life alert, cellular phones, etc.). The emergency communication packet may include, for example, the emergency SSID, the private SSID of a particular access point, an instruction to use a voice over internet protocol (VoIP), an instruction to use a GPS location request protocol, and/or an instruction to use any other protocols. For example, if a cellular tower stops working and a cellular phone places a call to an emergency responder (e.g., the fire department), then rather than connecting the call through the cellular tower the call may be connected via the emergency mesh using VoIP. More specifically, a cellular phone within wireless communication range of access point 705e may communicate with the emergency responder by wirelessly connecting with the access point 705e using the emergency SSID and/or the private SSID of access point 705e. The access point 705e may then relay the call to a headend device (e.g., mesh server 108) using the first emergency mesh. The mesh server 108 may then relay the call to the emergency responder. The emergency responder may send voice data to the cellular phone by sending the voice data to the mesh server 108, which then relays the voice data to the access points 705a,d,e and then to the cellular phone to establish communication between the cellular phone and the emergency responder. Other messages (e.g., short messaging service (SMS) messages, instant messages, emails, etc.) may be sent and received in a similar manner.

The GPS location request protocol may include instructions for the device (e.g., cellular phone) to transmit its GPS coordinate information so that the mesh server 108 may relay the GPS information to the emergency responders. In the event the cellular phone might not be able to transmit its GPS coordinate information, one or more neighboring access points (e.g., access point 705e) may transmit to the mesh server 108 an indication that the cellular phone is within their respective wireless coverage range. The mesh server 108 may triangulate and/or otherwise approximate the location of the cellular phone and may relay the approximated location of the cellular phone to the emergency responders.

In some embodiments, the mesh server 108 may, using a generated coverage map as discussed herein, identify one or more locations to place a cell backup tower so that there may be a backup route of communicating to the access points 705a-k.

In some embodiments, the access points 705a-k may continuously listen for the emergency SSID. As a result, the mesh server 108 may, using the emergency SSID, send a message to the access points 705a-k via bridging wireless connections as discussed above even when the access points 705a-k are in a non-emergency mode. For example, the message may be an instruction for one or more devices to reboot.

In some embodiments, the mesh server 108 may develop a disaster management plan. For example, the mesh server 108 may determine the scope of a disaster by analyzing which access points have lost network connectivity through their assigned distribution network (e.g., HFC lines). The mesh server 108 may update a generated coverage map to show which access points have lost network connectivity over their assigned distribution network. The mesh server 108 may transmit the generated coverage map showing network outages to emergency responders.

Figure 9:
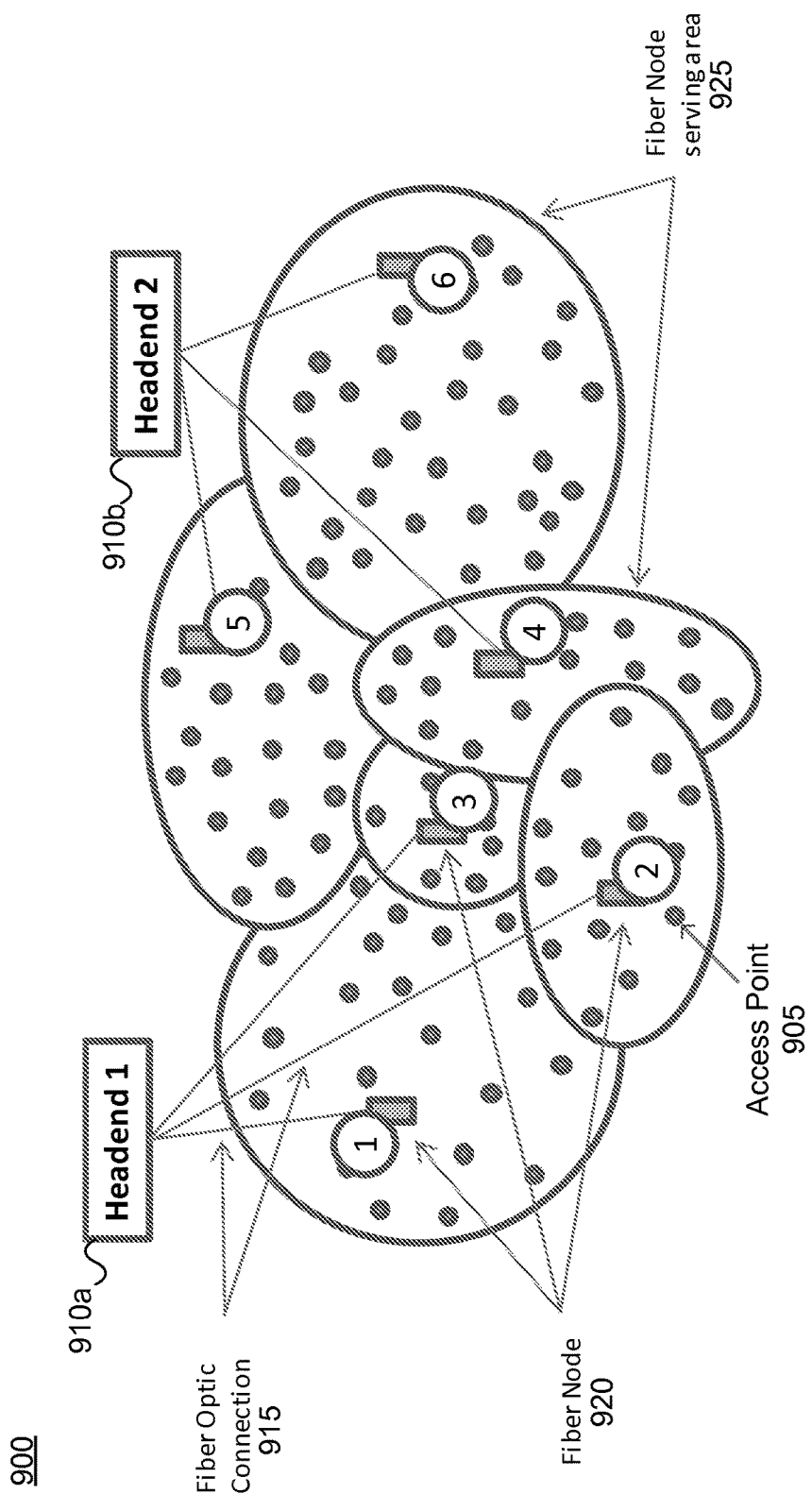
FIG. 9 illustrates an exemplary system for modeling a wireless network in accordance with one or more illustrative aspects discussed herein.

FIG. 9 illustrates an exemplary system for modeling a wireless network in accordance with one or more illustrative aspects discussed herein. The system 900 may include multiple access points 905 (e.g., eDVAs, EMTAs, modems, or the like) connected to at least one of the headends 910a-b through fiber optic connections 915 and fiber nodes 920. The fiber nodes 920 may be respectively associated with fiber node serving areas 925. In an exemplary embodiment, the system 900 may include six fiber nodes 920, six fiber optic connections 915, and six fiber node serving areas 925.

Figure 10:
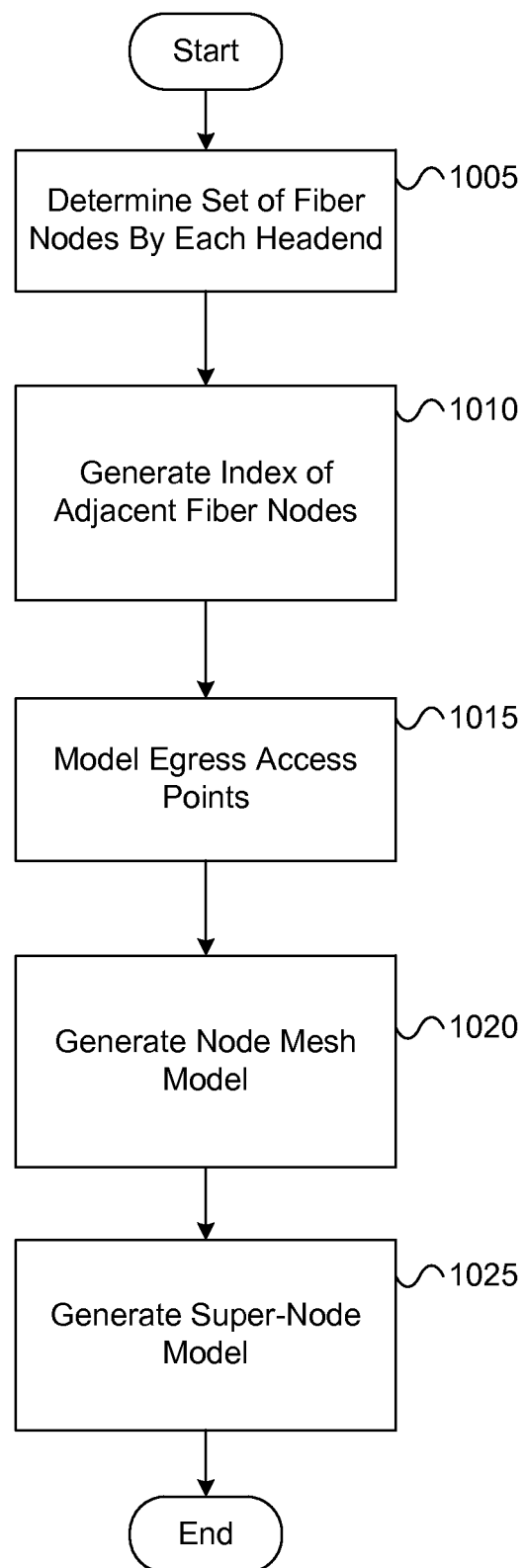
FIG. 10 illustrates a flowchart of an exemplary method for modeling a wireless network in accordance with one or more illustrative aspects discussed herein.

FIG. 10 illustrates a flowchart of an exemplary method for modeling a wireless network in accordance with one or more illustrative aspects discussed herein. In one or more embodiments, the method of FIG. 10 and/or one or more steps thereof may be performed by a computing device (e.g., computing device 200). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005 in which headends 910a-b may determine multiple sets of fibers nodes. For example, in step 1005, the first headend 910a may determine that the first headend 910a is connected with three of the six fiber nodes 920 (e.g., a first fiber node, a second fiber node and a third fiber node). The first headend 910a may determine each of the fiber node serving areas 925 associated with each the first three fiber nodes 920. The first headend 910a may determine each of the access point 905 on each of the first three fiber nodes 920.

Similarly, the second headend 910b may determine that the second headend 910b is connected with three of the six fiber nodes 920 (e.g., a fourth fiber node, a fifth fiber node and a sixth fiber node). The second headend 910b may determine each of the fiber node serving areas 925 associated with each the last three fiber nodes 920. The second headend 910b may determine each of the access point 905 on each of the last three fiber nodes 920.

In some embodiments, the headends 910a-b may determine the above information by, for example, retrieving the information from one or more databases of the headends 910a-b and/or by analyzing a generated coverage map as discussed herein.

In step 1010, the headends 910a-b may generate an index of adjacent fiber nodes. For example, in step 1010, one or both headends 910a-b may determine that the first of the six fiber nodes 920 may be adjacent to the second, third, and fifth of the six fiber nodes 920. The headends 910a-b may determine that the second of the six fiber nodes may be adjacent to first, third, and fourth of the six fiber nodes 920. The headends 910a-b may determine that the third of the six fiber nodes 920 may be adjacent to the first, second, fourth, and fifth of the six fiber nodes 920. The headends 910a-b may determine that the fourth of the six fiber nodes 920 may be adjacent to second, third, fifth, and sixth of the six fiber nodes 920. The headends 910a-b may determine that the fifth of the six fiber nodes 920 may be adjacent to the first, third, fourth, and sixth of the fiber nodes 920. The headends 910a-b may determine that the sixth of the six fiber nodes may be adjacent to the fourth and fifth of the six fiber nodes 920. In some embodiments, the headends 910a-b may determine the adjacencies by analyzing the generated coverage map discussed herein.

In step 1015, the headends 910a-b may model each of the egress access points to determine which egress access points would create the optimum connections and throughput for an emergency mesh. For example, in step 1015, the headends 910a-b may determine one or more planned egress access points by analyzing each egress access point (e.g., one or more of the access points 905 with network connectivity over one of the fiber optic connections 915). For example, the first headend 910a may analyze the connection quality (e.g., data speed, bandwidth, signal strength, etc.) between the first headend 910a and each of the egress access points. For example, the first headend 910a may select a particular egress access point to become a "root" node for an emergency mesh when the particular egress access point has one or more of a higher data speed, greater bandwidth, and/or greater signal strength than that of another egress access point.

For example, the first headend 910a may analyze the geographical proximity of each of the egress access points to a boundary of their associated fiber node serving area 925. In other words, the first headend 910a may determine a distance between an egress access point and the boundary of its fiber node service area 925. For example, the first headend 910a may select a particular egress access point to become a "root" node for an emergency mesh, for example, when a distance between the particular egress access point and the boundary is above a predetermined threshold and/or greater than a distance of another egress access point.

For example, the first headend 910a may analyze a number of expected downstream connections over the fiber optic connections 915. For example, the first headend 910a may determine the number of current egress access points and/or the number of egress access points that may be a "root" node for an emergency mesh. The first headend 910a may also predict a number of access points (that might not currently have network connectivity over the fiber optic connections 915) but that may be expected to become egress access points (e.g., regain network connectivity) within a predetermined period of time.

Similarly, the second headend 910b may perform similar determinations for its egress access points. For example, the second headend 910b may analyze connection quality between the second headend 910b and each of the egress access points. For example the second headend 910b may analyze the geographical proximity of each of its egress access points to a boundary of their associated fiber node serving area 925. For example, the second headend 910b may analyze the number of expected downstream connection over the fiber optic connections 915.

In step 1020, the headends 910a-b may generate a node mesh model. For example, in step 1020, the headends 910a-b may determine how many access points and/or hops (as discussed above in FIG. 7) a particular emergency mesh may include while maintaining a data speed, bandwidth capacity, and/or throughput above a predetermined threshold value based on the determination and analysis performed in step 1015. For example, a potential emergency mesh may include at least a portion of one or more fiber node serving areas 925. A potential mesh may be commensurate with one or more fiber node serving areas 925. For example, a potential mesh may include access points 905 associated with two or more adjacent fiber nodes 920 determined in steps 1005 and 1010.

In step 1025, the headends 910a-b may generate a supernode model. For example, in step 1025, the headends 910a-b may create one or more emergency meshes that span more than two fiber serving areas 925. For example, in the event that the second headend 910b is no longer functioning, an emergency mesh may be used to connect the access points 905 of each of the six fiber node serving areas 925. The emergency mesh may have one or more "root" nodes (e.g., egress access points) with network connectivity over the fiber optic connections 915 to the first headend 910a.

In some embodiments, each of the steps 1005-1025 may be performed by the mesh server 108. While only six fiber nodes 920 and two headends 910a-b were discussed, in some instances, there may be fewer or additional fiber nodes and/or headends.

Referring back to FIG. 9, the headends 910a-b may include multiple CMTSs (not shown) and associated backplane routers (not shown) to route data to the access points 905. Each CMTS may include a dedicated router backplane and have an initial (e.g., default) transiting traffic route in its network core. In the event an emergency mesh is established in which one or more egress access points may relay data to one or more access points 905, the headends 910a-b (and/or mesh server 108) may dedicate more router backplane to a CMTS connected to an egress access point. The headends 910a-b (and/or mesh server 108) may update data and voice balances on one or more of the CMTSs to accommodate communications on the emergency mesh. The headends 910a-b (and/or mesh server 108) may reroute transiting traffic in network core to provide service to access points 905 that have lost network connectivity over the distribution network. For example, a CMTS that transmitted data to a first router during the initial route of transiting data may now transmit data to a second different router during the new route of transiting data. Additionally, the headends 910a-b may port filter downstream traffic to eliminate non-critical traffic.

In some embodiments, the service provider may coordinate with other service providers to permit emergency meshes to include access points of the service provider to connect with access points and/or headends of the other service provider. In some embodiments, the bridging the wireless connections of access points may span large distances (e.g., cities).

While the above embodiments may refer to Wi-Fi wireless connections, other wireless connections may be used in any of the above embodiments including, for example, satellite connections, cellular connections, Bluetooth connections, or any other wireless connection. In some embodiments, multiple different types of wireless connections may be used within an emergency mesh.

Although the subject matter disclosed herein has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
  determining, by a computing device, a wireless coverage range of a first wireless access node of a plurality of wireless access nodes; and
  based on the wireless coverage range of the first wireless access node and a connectivity problem associated with a second wireless access node, causing the first wireless access node to send, to the second wireless access node, a message that comprises information for establishing wireless communication between the first wireless access node and the second wireless access node.

2. The method of claim 1, wherein the first wireless access node is associated with a first distribution network of an upstream network device and the second wireless access node is associated with a second distribution network of the upstream network device, wherein the first distribution network is different from the second distribution network and wherein the method further comprises:
  provisioning the first wireless access node for a first bandwidth capacity greater than a second bandwidth capacity associated with the first distribution network.

3. The method of claim 1, further comprising:
  sending, to the first wireless access node, at least one message configured to cause the first wireless access node to:
    determine, based on a loss of connectivity to an upstream network device, whether a geographically adjacent wireless access node has connectivity to the upstream network device, and
    connect to the geographically adjacent wireless access node based on determining that the geographically adjacent wireless access node has connectivity to the upstream network device.

4. The method of claim 1, wherein the causing is based on determining that the second wireless access node does not have connectivity to an upstream network device.

5. The method of claim 1, further comprising:
  receiving, from the first wireless access node, a second message transferred from the second wireless access node; and
  sending the second message to an emergency service provider.

6. The method of claim 1, wherein the determining is based on a geographic location of a third wireless access node of the plurality of wireless access nodes.

7. The method of claim 1, further comprising receiving, by the computing device and from a third wireless access node of the plurality of wireless access nodes, an indication that the third wireless access node detected the first wireless access node.

8. An apparatus comprising:
  one or more processors; and
  memory storing instructions that, when executed by the one or more processors, cause the apparatus to:
    determine a wireless coverage range of a first wireless access node of a plurality of wireless access nodes; and
    based on the wireless coverage range of the first wireless access node and a connectivity problem associated with a second wireless access node, cause the first wireless access node to send, to the second wireless access node, a message that comprises information for establishing wireless communication between the first wireless access node and the second wireless access node.

9. The apparatus of claim 8, wherein the first wireless access node is associated with a first distribution network of an upstream network device and the second wireless access node is associated with a second distribution network of the upstream network device, wherein the first distribution network is different from the second distribution network, and wherein the instructions, when executed by the one or more processors, cause the apparatus to:
  provision the first wireless access node for a first bandwidth capacity greater than a second bandwidth capacity associated with the first distribution network.

10. The apparatus of claim 8, wherein the instructions, when executed by the one or more processors, cause the apparatus to:
  send, to the first wireless access node, at least one message configured to cause the first wireless access node to:
    determine, based on a loss of connectivity to an upstream network device, whether a geographically adjacent wireless access node has connectivity to the upstream network device, and
    connect to the geographically adjacent wireless access node based on determining that the geographically adjacent wireless access node has connectivity to the upstream network device.

11. The apparatus of claim 8, wherein the instructions, when executed by the one or more processors, cause the apparatus to:
  cause the first wireless access node to send the message to the second wireless access node based on a determination that the second wireless access node does not have connectivity to an upstream network device.

12. The apparatus of claim 8, wherein the instructions, when executed by the one or more processors, cause the apparatus to:
  receive, from the first wireless access node, a second message transferred from the second wireless access node; and
  send the second message to an emergency service provider.

13. The apparatus of claim 8, wherein the instructions, when executed by the one or more processors, cause the apparatus to:
  determine the wireless coverage range of the first wireless access node based on a geographic location of a third wireless access node of the plurality of wireless access nodes.

14. The apparatus of claim 8, wherein the instructions, when executed by the one or more processors, cause the apparatus to:
  receive, from a third wireless access node of the plurality of wireless access nodes, an indication that the third wireless access node detected the first wireless access node.

15. A system comprising:
  a computing device and a first wireless access node of a plurality of wireless access nodes, wherein the computing device is configured to:
    determine a wireless coverage range of the first wireless access node of the plurality of wireless access nodes; and
    based on the wireless coverage range of the first wireless access node and a connectivity problem associated with a second wireless access node, cause the first wireless access node to send, to the second wireless access node, a message that comprises information for establishing wireless communication between the first wireless access node and the second wireless access node; and wherein the first wireless access node is configured to:
send the message to the second wireless access node.

16. The system of claim 15, wherein the first wireless access node is associated with a first distribution network of an upstream network device and the second wireless access node is associated with a second distribution network of the upstream network device, wherein the first distribution network is different from the second distribution network, and wherein the computing device is further configured to:
provision the first wireless access node for a first bandwidth capacity greater than a second bandwidth capacity associated with the first distribution network.

17. The system of claim 15, wherein the computing device is further configured to:
send, to the first wireless access node, at least one message configured to cause the first wireless access node to:
determine, based on a loss of connectivity to an upstream network device, whether a geographically adjacent wireless access node has connectivity to the upstream network device, and
connect to the geographically adjacent wireless access node based on determining that the geographically adjacent wireless access node has connectivity to the upstream network device.

18. The system of claim 15, wherein the computing device is further configured to cause the first wireless access node to send the message to the second wireless access node based on a determination that the second wireless access node does not have connectivity to an upstream network device.

19. The system of claim 15, wherein the computing device is further configured to:
receive, from the first wireless access node, a second message transferred from the second wireless access node; and
send the second message to an emergency service provider.

20. The system of claim 15, wherein the computing device is further configured to:
receive, from a third wireless access node of the plurality of wireless access nodes, an indication that the third wireless access node detected the first wireless access node; and
determine the wireless coverage range of the first wireless access node based on a geographic location of the third wireless access node.

21. A non-transitory computer-readable medium storing instructions that, when executed, cause:

determining a wireless coverage range of a first wireless access node of a plurality of wireless access nodes; and
based on the wireless coverage range of the first wireless access node and a connectivity problem associated with a second wireless access node, causing the first wireless access node to send, to the second wireless access node, a message that comprises information for establishing wireless communication between the first wireless access node and the second wireless access node.

22. The non-transitory computer-readable medium of claim 21, wherein the first wireless access node is associated with a first distribution network of an upstream network device and the second wireless access node is associated with a second distribution network of the upstream network device, wherein the first distribution network is different from the second distribution network, and wherein the instructions, when executed, further cause:
provisioning the first wireless access node for a first bandwidth capacity greater than a second bandwidth capacity associated with the first distribution network.

23. The non-transitory computer-readable medium of claim 21, wherein the instructions, when executed, further cause:
sending, to the first wireless access node, at least one message configured to cause the first wireless access node to:
determine, based on a loss of connectivity to an upstream network device, whether a geographically adjacent wireless access node has connectivity to the upstream network device, and
connect to the geographically adjacent wireless access node based on determining that the geographically adjacent wireless access node has connectivity to the upstream network device.

24. The non-transitory computer-readable medium of claim 21, wherein the causing is based on a determination that the second wireless access node does not have connectivity to an upstream network device.

25. The non-transitory computer-readable medium of claim 21, wherein the instructions, when executed, further cause:
receiving, from the first wireless access node, a second message transferred from the second wireless access node; and
sending the second message to an emergency service provider.

26. The non-transitory computer-readable medium of claim 21, wherein the instructions, when executed, further cause:
receiving, from a third wireless access node of the plurality of wireless access nodes, an indication that the third wireless access node detected the first wireless access node.

\* \* \* \* \*

UNITED STATES PATENT AND TRADEMARK OFFICE
CERTIFICATE OF CORRECTION

Page 1 of 3

PATENT NO. : 11,765,679 B2
APPLICATION NO. : 17/073955
DATED : September 19, 2023
INVENTOR(S) : Krening et al.

It is certified that error appears in the above-identified patent and that said Letters Patent is hereby corrected as shown below:

In the Specification

Column 8, Detailed Description, Line 53:
Delete "305$a$-1" and insert --305$a$-$l$-- therefor Column 8, Detailed Description, Line 54:
Delete "305$a$-1" and insert --305$a$-$l$-- therefor Column 8, Detailed Description, Line 59:
Delete "305$a$-1" and insert --305$a$-$l$-- therefor Column 8, Detailed Description, Line 66:
Delete "305$a$-1" and insert --305$a$-$l$-- therefor Column 9, Detailed Description, Line 2:
Delete "305$a$-1." and insert --305$a$-$l$.-- therefor Column 9, Detailed Description, Line 3:
Delete "305$a$-1," and insert --305$a$-$l$,-- therefor Column 9, Detailed Description, Line 16:
Delete "305$a$-1)" and insert --305$a$-$l$)-- therefor Column 9, Detailed Description, Line 22:
Delete "315$a$-1" and insert --315$a$-$l$-- therefor Column 9, Detailed Description, Line 23:
Delete "305$a$-1" and insert --305$a$-$l$-- therefor Column 9, Detailed Description, Line 29:

Signed and Sealed this
Twelfth Day of November, 2024

Katherine Kelly Vidal
*Director of the United States Patent and Trademark Office*

Delete "305*a*-1." and insert --305*a*-*l*.-- therefor

Column 9, Detailed Description, Line 34:
Delete "305*a*-1" and insert --305*a*-*l*-- therefor Column 9, Detailed Description, Line 35:
Delete "305*a*-1" and insert --305*a*-*l*-- therefor Column 9, Detailed Description, Line 39:
Delete "315*a*-1" and insert --315*a*-*l*-- therefor Column 9, Detailed Description, Line 40:
Delete "305*a*-1)" and insert --305*a*-*l*)-- therefor Column 9, Detailed Description, Line 42:
Delete "305*a*-1." and insert --305*a*-*l*.-- therefor Column 9, Detailed Description, Line 42:
Delete "305*a*-1" and insert --305*a*-*l*-- therefor Column 9, Detailed Description, Line 43:
Delete "305*a*-1" and insert --305*a*-*l*-- therefor Column 9, Detailed Description, Line 64:
Delete "305*a*-1" and insert --305*a*-*l*-- therefor Column 10, Detailed Description, Line 49:
Delete "305*a*-1" and insert --305*a*-*l*-- therefor Column 10, Detailed Description, Line 51:
Delete "305*a*-1" and insert --305*a*-*l*-- therefor Column 10, Detailed Description, Line 62:
Delete "305*a*-1," and insert --305*a*-*l*,-- therefor Column 10, Detailed Description, Line 63:
Delete "305*a*-1" and insert --305*a*-*l*-- therefor Column 11, Detailed Description, Line 2:
Delete "315*a*-1)" and insert --315*a*-*l*)-- therefor Column 11, Detailed Description, Line 4:
Delete "305*a*-1." and insert --305*a*-*l*.-- therefor Column 11, Detailed Description, Line 8:
Delete "315*b*-1" and insert --315*b*-*l*-- therefor

CERTIFICATE OF CORRECTION (continued)
U.S. Pat. No. 11,765,679 B2

Column 11, Detailed Description, Line 9:
Delete "305*b*-1" and insert --305*b-l*-- therefor Column 11, Detailed Description, Line 11:
Delete "305*a*-1" and insert --305*a-l*-- therefor Column 11, Detailed Description, Line 24:
Delete "305*a*-1." and insert --305*a-l*.-- therefor Column 20, Detailed Description, Line 44:
Delete "5150" and insert --515*f)*-- therefor In the Claims Column 33, Line 23:
In Claim 2, after "network", insert --,-- therefor